US011580970B2

(12) United States Patent
Shin et al.

(10) Patent No.: US 11,580,970 B2
(45) Date of Patent: Feb. 14, 2023

(54) SYSTEM AND METHOD FOR CONTEXT-ENRICHED ATTENTIVE MEMORY NETWORK WITH GLOBAL AND LOCAL ENCODING FOR DIALOGUE BREAKDOWN DETECTION

(71) Applicant: Samsung Electronics Co., Ltd., Suwon-si (KR)

(72) Inventors: JongHo Shin, Santa Clara, CA (US); Alireza Dirafzoon, San Jose, CA (US); Aviral Anshu, Mountain View, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 120 days.

(21) Appl. No.: 16/826,713

(22) Filed: Mar. 23, 2020

(65) Prior Publication Data
US 2020/0321002 A1  Oct. 8, 2020

Related U.S. Application Data

(60) Provisional application No. 62/886,147, filed on Aug. 13, 2019, provisional application No. 62/830,337, filed on Apr. 5, 2019.

(51) Int. Cl.
*G10L 15/22* (2006.01)
*G06N 3/049* (2023.01)

(52) U.S. Cl.
CPC .............. *G10L 15/22* (2013.01); *G06N 3/049* (2013.01); *G10L 2015/221* (2013.01); *G10L 2015/228* (2013.01)

(58) Field of Classification Search
None
See application file for complete search history.

(56) References Cited

U.S. PATENT DOCUMENTS 3,719,015 A    3/1973  Misawa et al.
7,457,748 B2 *  11/2008  Nefti ...................... G10L 15/18
                                                        704/260

(Continued)

FOREIGN PATENT DOCUMENTS

KR    10-2011-0066357 A    6/2011

OTHER PUBLICATIONS

Takayama, Junya, Eriko Nomoto, and Yuki Arase. "Dialogue breakdown detection robust to variations in annotators and dialogue systems." Computer Speech & Language 54 (2019): 31-43. (Year: 2019).*

(Continued)

*Primary Examiner* — Seong-Ah A Shin

(57) ABSTRACT

A method, an electronic device and computer readable medium for dialogue breakdown detection are provided. The method includes obtaining a verbal input from an audio sensor. The method also includes generating a reply to the verbal input. The method additionally includes identifying a local context from the verbal input and a global context from the verbal input, additional verbal inputs previously received by the audio sensor, and previous replies generated in response to the additional verbal inputs. The method further includes identifying a dialogue breakdown in response to determining that the reply does not correspond to the local context and the global context. In addition, the method includes generating sound corresponding to the reply through a speaker when the dialogue breakdown is not identified.

20 Claims, 14 Drawing Sheets

(56) References Cited

U.S. PATENT DOCUMENTS

| | | | | |
|---|---|---|---|---|
| 7,493,257 | B2* | 2/2009 | Kim | G10L 15/22 704/275 |
| 8,719,015 | B2* | 5/2014 | Jang | G06V 40/70 704/270.1 |
| 10,332,033 | B2* | 6/2019 | Kwon | G10L 15/22 |
| 10,872,609 | B2* | 12/2020 | Sugiyama | G10L 15/22 |
| 11,183,187 | B2* | 11/2021 | Sugiyama | G06F 40/205 |
| 2006/0095268 | A1* | 5/2006 | Yano | G10L 15/22 704/E15.04 |
| 2009/0141871 | A1* | 6/2009 | Horioka | H04M 3/493 379/88.04 |
| 2010/0023320 | A1* | 1/2010 | Di Cristo | G06F 40/232 704/E15.001 |
| 2014/0025380 | A1* | 1/2014 | Koch | G10L 15/30 704/E15.005 |
| 2014/0297268 | A1* | 10/2014 | Govrin | G06N 5/02 704/9 |
| 2015/0314454 | A1* | 11/2015 | Breazeal | B25J 11/001 700/259 |
| 2016/0246929 | A1* | 8/2016 | Zenati | G10L 15/22 |
| 2016/0259775 | A1* | 9/2016 | Gelfenbeyn | G06F 40/35 |
| 2019/0130904 | A1* | 5/2019 | Homma | G10L 15/18 |
| 2019/0258714 | A1* | 8/2019 | Zhong | G06N 3/084 |
| 2020/0034764 | A1* | 1/2020 | Panuganty | G06F 40/284 |
| 2020/0211536 | A1* | 7/2020 | Shmueli-Scheuer | G06N 5/041 |

OTHER PUBLICATIONS

Park, et al; Attention-based Dialog Embedding for Dialog Breakdown Detection; DSTC6 Dialog System Technology Challenges Workshop Program; Hyatt Regency Long Beach, CA; Dec. 10, 2017; 5 pgs.

Takayama, et al; Dialogue breakdown detection robust to variations in annotators and dialogue system; Graduate School of Information Science and Technology, Osaka University, Yamadaoka 1-12, Suita City, Osaka Prefecture 565-0871, Japan; Mar. 11, 2018; Online Aug. 29, 2018; 13 pgs.

Notification of Transmittal of the International Search Report and the Written Opinion of the International Searching Authority, or the Declaration dated Jul. 7, 2020 in connection with International Patent Application No. PCT/KR2020/004575, 10 pages.

Extended European Search Report in connection with counterpart European Patent Application No. 20783057.1 dated Mar. 7, 2022, 11 pages.

Xie et al., "Dialogue Breakdown Detection using Hierarchical Bi-Directional LSTMs," Proceedings of the Dialog System Technology Challenges Workshop, Dec. 2017, 5 pages.

* cited by examiner

SYSTEM AND METHOD FOR CONTEXT-ENRICHED ATTENTIVE MEMORY NETWORK WITH GLOBAL AND LOCAL ENCODING FOR DIALOGUE BREAKDOWN DETECTION

CROSS-REFERENCE TO RELATED APPLICATION AND CLAIM OF PRIORITY

This application claims priority under 35 U.S.C. § 119(e) to U.S. Provisional Patent Application No. 62/830,337 filed on Apr. 5, 2019 and U.S. Provisional Patent Application No. 62/886,147 filed on Aug. 13, 2019. The above-identified provisional patent applications are hereby incorporated by reference in its entirety.

TECHNICAL FIELD

This disclosure relates generally to natural language processing. More specifically, this disclosure relates to identifying dialogue breakdowns during dialogue between a user and an electronic device.

BACKGROUND

Methods for interacting with and controlling computing devices are continually improving in order to create more natural user interfaces. Many such methods for interacting with and controlling computing devices generally require users to utilize an accessory, such as a keyboard, a mouse, a touch pad, or a touchscreen, where a user physically interacts with the accessory to control the computing device. Some electronic devices employ natural language processing that enable users to interact with computing devices via a natural language input. For example, natural language input can include a voice enabled user interface where a user can interact with the computing device by speaking. The electronic device is able to perform the request of the user as well as provide a verbal response to the user in the form of a follow up question or a comment.

Dialogue breakdown involves the generation of an incorrect response by the electronic devices. An electronic device that can detect and correct for a dialoged breakdown between itself and a user plays an increasingly important role in consumer satisfaction with respect to artificial intelligent (AI) based system.

SUMMARY

This disclosure provides systems and methods for context-enriched attentive memory network with global and local encoding for dialogue breakdown detection.

In a first embodiment, a method includes obtaining a verbal input from an audio sensor. The method also includes generating a reply to the verbal input. The method additionally includes identifying a local context from the verbal input and a global context from the verbal input, additional verbal inputs previously received by the audio sensor, and previous replies generated in response to the additional verbal inputs. The method further includes identifying a dialogue breakdown in response to determining that the reply does not corresponds to the local context and the global context. In addition, the method includes generating sound corresponding to the reply through a speaker when the dialogue breakdown is not identified.

In a second embodiment, an electronic device includes an audio sensor, a speaker, and a processor. The processor is configured to obtain a verbal input from the audio sensor. The processor is also configured to generate a reply to the verbal input. The processor is additionally configured to identify a local context from the verbal input and a global context from the verbal input, additional verbal inputs previously received by the audio sensor, and previous replies generated in response to the additional verbal inputs. The processor is further configured to identify a dialogue breakdown in response to determining that the reply does not corresponds to the local context and the global context. In addition, the processor is configured to generate sound corresponding to the reply through the speaker when the dialogue breakdown is not identified.

In a third embodiment, a non-transitory machine-readable medium contains instructions that, when executed, cause at least one processor of an electronic device to obtain a verbal input from the audio sensor. The medium also contains instructions that, when executed, cause the at least one processor to generate a reply to the verbal input. The medium additionally contains instructions that, when executed, cause the at least one processor to identify a local context from the verbal input and a global context from the verbal input, additional verbal inputs previously received by the audio sensor, and previous replies generated in response to the additional verbal inputs. The medium further, contains instructions that, when executed, cause the at least one processor to identify a dialogue breakdown in response to determining that the reply does not corresponds to the local context and the global context. In addition, the medium contains instructions that, when executed, cause the at least one processor to generate sound corresponding to the reply through the speaker when the dialogue breakdown is not identified.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
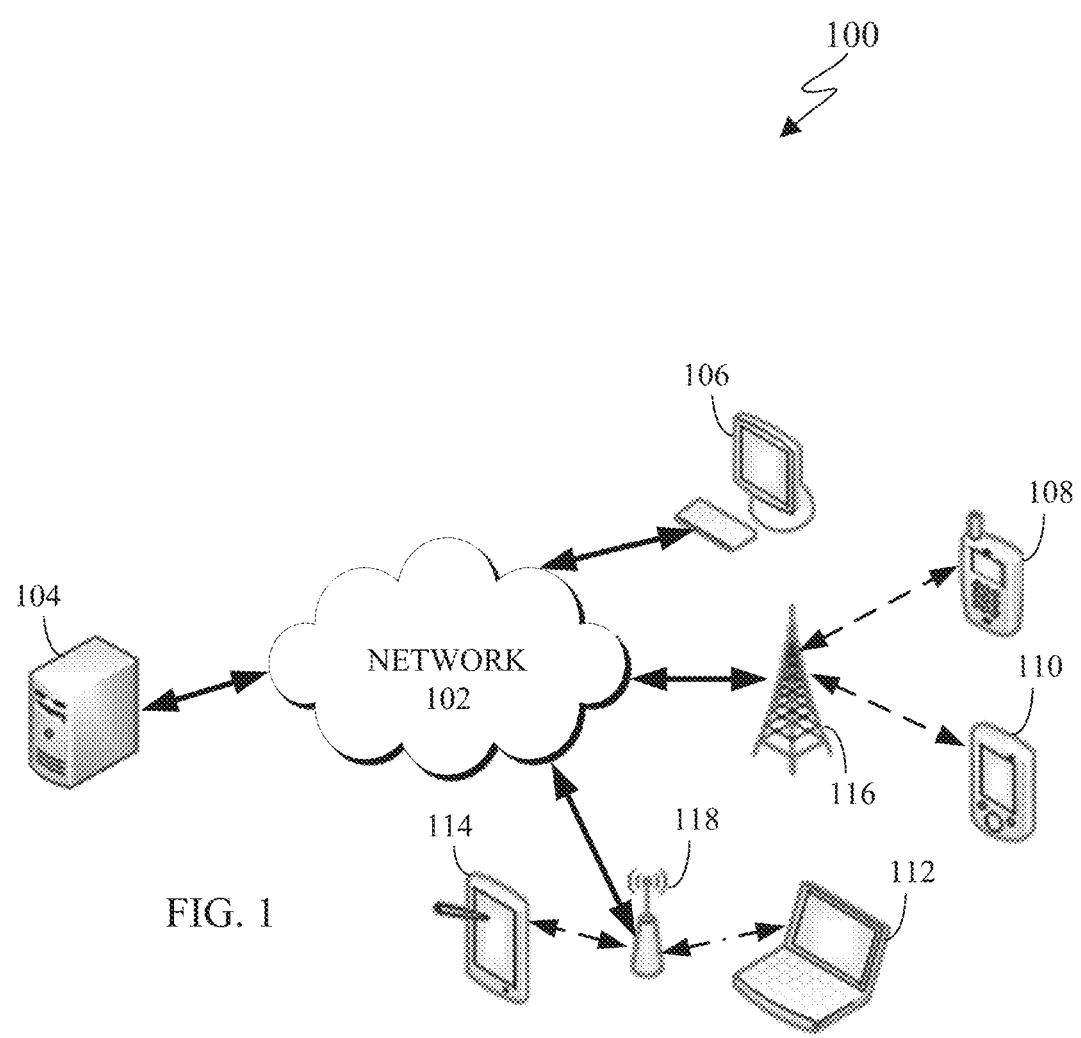
FIG. 1 illustrates an example communication system in accordance with an embodiment of this disclosure.

FIGS. 1 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged system or device.

A user can interact with an electronic device using one or more accessories such as a keyboard, a mouse, a touchpad, a remote, a touch screen, and the like. Common interactions include physical manipulations of the accessory, such as, a user physically moving the mouse, typing on the keyboard, touching the touch screen of a touch sensitive surface, among others. There are instances when utilizing various accessories to interact with the electronic device are not feasible, such as when a user wears a head mounted display, if the device does not include a display, and the like. Additionally, there are instances when utilizing various physical interactions such as touching a touchscreen or using moving a mouse is inconvenient or cumbersome. It is noted that as used herein, the term "user" may denote a human or another device (such as an artificial intelligent electronic device) using the electronic device.

An electronic device, according to embodiments of the present disclosure, can include a personal computer (such as a laptop, a desktop, and a tablet), a workstation, a server, a television, an appliance, and the like. Additionally, the electronic device can be at least one of a part of a piece of furniture or building/structure, an electronic board, an electronic signature receiving device, a projector, a security control panel, a gamming console, or a measurement device. In certain embodiments, the electronic device can be a portable electronic device such as a portable communication device (such as a smartphone or mobile phone), a laptop, a tablet, an electronic book reader (such as an e-reader), a personal digital assistants (PDAs), a portable multimedia player (PMPs), a MP3 player, a mobile medical device, a virtual reality headset, a portable game console, a camera, and a wearable device (smart glasses, head mounted display, rings, bracelets, watches), electronic cloths, among others. The electronic device is one or a combination of the above-listed devices. Additionally, the electronic device as disclosed herein is not limited to the above-listed devices, and can include new electronic devices depending on the development of technology.

An electronic device, according to embodiments of the present disclosure, can include a virtual personal assistant, a smart assistant, an artificial intelligence (AI) assistant, a smart hub, and the like (collectively referred to here as virtual assistant). It is noted that a virtual assistant can be included with another device, such as a smart phone. Virtual assistant devices are a family of devices that can perform various tasks and services for a user. For example, based on a received user input, a virtual assistant can provide a variety of services, such as providing the weather, setting an alarm, creating a calendar entry, creating and maintaining a shopping list, playing music, turning on or off a specific devices (such as an appliance, a television program, a light bulb, or an electrical outlet, among others), finding and purchasing items, and the like. A virtual assistant can often interact with a user through a voice-enabled user interface, which enables a user to speak to the virtual assistant and the virtual assistant can verbally reply to the user.

According to embodiments of the present disclosure, a natural approach to interact with and control an electronic device is a voice enabled user interface. Voice enabled user interfaces enable a user to interact with a computing device through the act of providing a natural language input such as verbally speaking. Speaking can include a human speaking directly to the electronic device or another electronic device projecting sound through a speaker. Once the virtual assistant detects and receives the sound, the virtual assistant can derive contextual meaning from the utterance and thereafter perform the requested task or if necessary request additional information from the user. It should be noted that natural language inputs are not limited to verbal utterances. For example, natural language inputs can include typed inputs.

Natural language processing enables a virtual assistant to interact with a user by using natural language. Natural language processing can include automatic speech recognition (ASR), natural language understanding (NLU), and text to speech (TTS). ASR can convert a received verbal input to text as well as include various language models for recognizing the words of the input. NLU enables the virtual assistant to understand a received natural language input. TTS converts text to speech enabling the virtual assistant to respond to the user.

For example, if a user verbally instructs the virtual assistant to "call spouse," the virtual assistant can identify the task as a request to use the phone function, activate the phone feature of the device, look up a phone number associated with "spouse," and subsequently dial the phone number of the user's spouse. As another example, a user can verbally instruct a virtual assistant to make a reservation at a restaurant. The virtual assistant will then need to request additional information from the user such as the date, a time, restaurant name, number of persons to be included in the reservation, and the like. The virtual assistant can receive the additional information from the user to make the reservation. If there is an issue, such as the desired restaurant is unable to accommodate the reservation at the requested time, the virtual assistant would need to provides the user with the information and could even request an alternative time from the user or suggest an alternative day and time that the restraint to accommodate the reservation.

A dialogue breakdown can occur between the virtual assistant and the user when the virtual assistant generates an incorrect response when responding to the user. A result of a dialogue breakdown creates difficulty for the user to respond to the virtual assistant.

For example, dialogue breakdown can occur when the virtual assistant does not hear the entire verbal input by the user. For instance, the virtual assistant may not hear a particular portion of the verbal input, due to loud ambient noises. For another example, a dialogue breakdown can occur when the virtual assistant incorrectly interprets a verbal input from a user. For example, during a conversation between a user and a virtual assistant regarding creating a calendar entry for a picnic with the family of the user, the user can state "I NEED TO SPEND SOME TIME ALONE BEFORE THE PICNIC." When responding to the user, the virtual assistant, can state "GOING ON A PICNIC ALONE IS FUN." In this example, the virtual assistant incorrectly interpreted the word alone as the user requesting to go on the picnic alone instead of spending time alone before going on the picnic with their family. Further, dialogue breakdown can also occur when the user verbally states one thing but intended to state something else. For example, the user requests the virtual assistant to display a list of files stored on an electronic device but the user intended the virtual assistant to display a list of images stored on the electronic device.

Embodiments of this disclosure include systems and methods for detecting a dialogue breakdown. In certain embodiments, dialogue breakdown is detected based on local and global context associated with the conversation between the user and the virtual assistant. Embodiments of this disclosure also include systems and methods for notifying a user of a dialogue. Additionally, embodiments of this disclosure include systems and methods for recovering from a dialogue breakdown.

FIG. 1 illustrates an example communication system 100 in accordance with an embodiment of this disclosure. The embodiment of the communication system 100 shown in FIG. 1 is for illustration only. Other embodiments of the communication system 100 can be used without departing from the scope of this disclosure.

The communication system 100 includes a network 102 that facilitates communication between various components in the communication system 100. For example, the network 102 can communicate Internet Protocol (IP) packets, frame relay frames, Asynchronous Transfer Mode (ATM) cells, or other information between network addresses. The network 102 includes one or more local area networks (LANs), metropolitan area networks (MANs), wide area networks (WANs), all or a portion of a global network such as the Internet, or any other communication system or systems at one or more locations.

In this example, the network 102 facilitates communications between a server 104 and various client devices 106-114. The client devices 106-114 may be, for example, a smartphone, a tablet computer, a laptop, a personal computer, a wearable device, a head-mounted display (HMD), virtual assistant, or the like. The server 104 can represent one or more servers. Each server 104 includes any suitable computing or processing device that can provide computing services for one or more client devices, such as the client devices 106-114. Each server 104 could, for example, include one or more processing devices, one or more memories storing instructions and data, and one or more network interfaces facilitating communication over the network 102.

Each client device 106-114 represents any suitable computing or processing device that interacts with at least one server (such as the server 104) or other computing device(s) over the network 102. In this example, the client devices 106-114 include a desktop computer 106, a mobile telephone or mobile device 108 (such as a smartphone), a PDA 110, a laptop computer 112, and a tablet computer 114. However, any other or additional client devices could be used in the communication system 100. Smartphones represent a class of mobile devices 108 that are handheld devices with mobile operating systems and integrated mobile broadband cellular network connections for voice, short message service (SMS), and Internet data communications. As described in more detail below, an electronic device (such as the desktop computer 106, mobile device 108, PDA 110, laptop computer 112, or tablet computer 114) can be a virtual assistant device that receives natural language inputs, such as verbal utterances, from a user and performs the intended actions.

In this example, some client devices 108-114 communicate indirectly with the network 102. For example, the client devices 108 and 110 (mobile device 108 and PDA 110, respectively) communicate via one or more base stations 116, such as cellular base stations or eNodeBs (eNBs). Also, the client devices 112 and 114 (laptop computer 112 and tablet computer 114, respectively) communicate via one or more wireless access points 118, such as IEEE 802.11 wireless access points. Note that these are for illustration only and that each client device 106-114 could communicate directly with the network 102 or indirectly with the network 102 via any suitable intermediate device(s) or network(s).

In some embodiments, any of the client devices 106-114 transmits information securely and efficiently to another device, such as, for example, the server 104. Also, any of the client devices 106-114 can trigger the information transmission between itself and server 104.

Although FIG. 1 illustrates one example of a communication system 100, various changes can be made to FIG. 1. For example, the communication system 100 could include any number of each component in any suitable arrangement.

In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2:
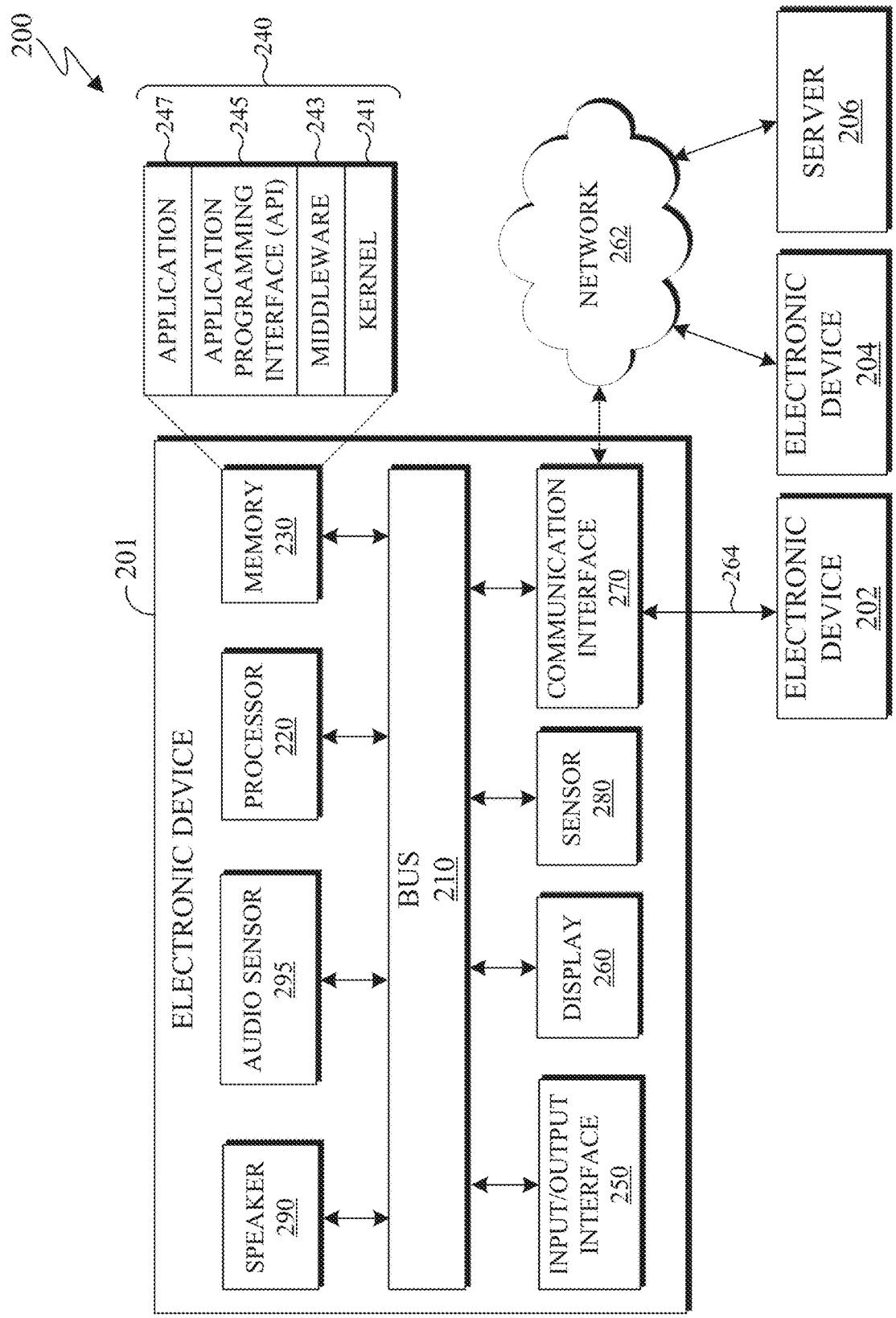
FIG. 2 illustrates an example network configuration including electronic devices in accordance with this disclosure.

FIG. 2 illustrates an example network configuration 200 including electronic devices in accordance with this disclosure. The embodiment of the network configuration 200 shown in FIG. 2 is for illustration only. Other embodiments of the network configuration 200 could be used without departing from the scope of this disclosure.

According to embodiments of this disclosure, an electronic device 201 is included in the network configuration 200. The electronic device 201 can be similar to any of the client devices 106-114 of FIG. 1. In certain embodiments, the electronic device 201 is a virtual assistant. In other embodiments, the electronic device 201 includes a virtual assistant. The electronic device 201 can include at least one of a bus 210, a processor 220, a memory 230, an input/output (I/O) interface 250, a display 260, a communication interface 270, one or more sensors 280, a speaker 290, or a microphone. In some embodiments, the electronic device 201 may exclude at least one of these components or may add at least one other component. The bus 210 includes a circuit for connecting the components 220-295 with one another and for transferring communications (such as control messages and/or data) between the components.

The processor 220 includes one or more of a central processing unit (CPU), a graphics processor unit (GPU), an application processor (AP), or a communication processor (CP). The processor 220 is able to perform control on at least one of the other components of the electronic device 201 and/or perform an operation or data processing relating to communication. In certain embodiments, the processor 220 performs natural language processing and is able to detect a breakdown in the dialogue as well as recover from the detected dialogue breakdown.

The memory 230 can include a volatile and/or non-volatile memory. For example, the memory 230 can store commands or data related to at least one other component of the electronic device 201. According to embodiments of this disclosure, the memory 230 can store software and/or a program 240. The program 240 includes, for example, a kernel 241, middleware 243, an application programming interface (API) 245, and/or an application program (or "application") 247. At least a portion of the kernel 241, middleware 243, or API 245 may be denoted as an operating system (OS).

The kernel 241 can control or manage system resources (such as the bus 210, processor 220, or memory 230) used to perform operations or functions implemented in other programs (such as the middleware 243, API 245, or application 247). The kernel 241 provides an interface that allows the middleware 243, the API 245, or the application 247 to access the individual components of the electronic device 201 to control or manage the system resources. The application 247 includes one or more applications for dialogue breakdown detection and recovery as discussed below. These functions can be performed by a single application or by multiple applications that each carries out one or more of these functions. The middleware 243 can function as a relay to allow the API 245 or the application 247 to communicate data with the kernel 241, for instance. A plurality of applications 247 can be provided. The middleware 243 is able to control work requests received from the applications 247, such as by allocating the priority of using the system resources of the electronic device 201 (like the bus 210, the processor 220, or the memory 230) to at least one of the plurality of applications 247. The API 245 is an interface allowing the application 247 to control functions provided from the kernel 241 or the middleware 243. For example, the API 245 includes at least one interface or function (such as a command) for filing control, window control, image processing, or text control.

The I/O interface 250 serves as an interface that can, for example, transfer commands or data input from a user or other external devices to other component(s) of the electronic device 201. The I/O interface 250 can also output commands or data received from other component(s) of the electronic device 201 to the user or the other external device.

The display 260 includes, for example, a liquid crystal display (LCD), a light emitting diode (LED) display, an organic light emitting diode (OLED) display, a quantum-dot light emitting diode (QLED) display, a microelectromechanical systems (MEMS) display, or an electronic paper display. The display 260 can also be a depth-aware display, such as a multi-focal display. The display 260 is able to display, for example, various contents (such as text, images, videos, icons, or symbols) to the user. The display 260 can include a touchscreen and may receive, for example, a touch, gesture, proximity, or hovering input using an electronic pen or a body portion of the user.

The communication interface 270, for example, is able to set up communication between the electronic device 201 and an external electronic device (such as an electronic device 202, a second electronic device 204, or a server 206). For example, the communication interface 270 can be connected with a network 262 or 264 through wireless or wired communication to communicate with the external electronic device. The communication interface 270 can be a wired or wireless transceiver or any other component for transmitting and receiving signals, such as images.

The wireless communication is able to use at least one of, for example, long term evolution (LTE), long term evolution-advanced (LTE-A), 5th generation wireless system (5G), millimeter-wave or 60 GHz wireless communication, Wireless USB, code division multiple access (CDMA), wideband code division multiple access (WCDMA), universal mobile telecommunication system (UMTS), wireless broadband (WiBro), or global system for mobile communication (GSM), as a cellular communication protocol. The wired connection can include, for example, at least one of a universal serial bus (USB), high definition multimedia interface (HDMI), recommended standard 232 (RS-232), or plain old telephone service (POTS). The network 262 or 264 includes at least one communication network, such as a computer network (like a local area network (LAN) or wide area network (WAN)), Internet, or a telephone network.

The electronic device 201 further includes one or more sensors 280 that can meter a physical quantity or detect an activation state of the electronic device 201 and convert metered or detected information into an electrical signal. For example, one or more sensors 280 can include one or more cameras or other imaging sensors for capturing images of scenes. The sensor(s) 280 can also include one or more buttons for touch input, a gesture sensor, a gyroscope or gyro sensor, an air pressure sensor, a magnetic sensor or magnetometer, an acceleration sensor or accelerometer, a grip sensor, a proximity sensor, a color sensor (such as a red green blue (RGB) sensor), a bio-physical sensor, a temperature sensor, a humidity sensor, an illumination sensor, an ultraviolet (UV) sensor, an electromyography (EMG) sensor, an electroencephalogram (EEG) sensor, an electrocardiogram (ECG) sensor, an infrared (IR) sensor, an ultrasound sensor, an iris sensor, or a fingerprint sensor. The sensor(s) 280 can further include an inertial measurement unit, which can include one or more accelerometers, gyroscopes, and other components. In addition, the sensor(s) 280 can include a control circuit for controlling at least one of the sensors included here. Any of these sensor(s) 280 can be located within the electronic device 201.

The electronic device 201 further includes one or more speakers 290 that convert electrical signals into sound and one or more audio sensors 295 that convert sound into electrical signals. The audio sensor 295 can be a microphone similar to a dynamic microphone, a condenser microphone, a piezoelectric microphone, or the like. The processor 220 can receive a verbal input (utterance) from a user via the audio sensors 295, processes the verbal input, and generate an output which is communicated to the user by the speaker 290.

The external electronic device 202 and the external electronic device 204 can be similar to any of the client devices 106-114 of FIG. 1. The external electronic devices 202 and 204 can include the same or similar components 210-295 as the electronic device 201 (or a suitable subset thereof). Additionally, the external electronic devices 202 and 204 can be a wearable device or an electronic device-mountable wearable device (such as an HMD). When the electronic device 201 is mounted in the electronic device 202 (such as the HMD), the electronic device 201 can communicate with the electronic device 202 through the communication interface 270. The electronic device 201 can be directly connected with the electronic device 202 to communicate with the electronic device 202 without involving with a separate network. The electronic device 201 can also be an augmented reality wearable device, such as eyeglasses, that include one or more cameras.

The external electronic devices 202 and 204 and the server 206 each can be a device of the same or a different type from the electronic device 201. According to certain embodiments of this disclosure, the server 206 includes a group of one or more servers. The server 206 can be similar to the server 104 of FIG. 1. Also, according to certain embodiments of this disclosure, all or some of the operations executed on the electronic device 201 can be executed on another or multiple other electronic devices (such as the electronic devices 202 and 204 or server 206). Further, according to certain embodiments of this disclosure, when the electronic device 201 should perform some function or service automatically or at a request, the electronic device 201, instead of executing the function or service on its own or additionally, can request another device (such as electronic devices 202 and 204 or server 206) to perform at least some functions associated therewith. The other electronic device (such as electronic devices 202 and 204 or server 206) is able to execute the requested functions or additional functions and transfer a result of the execution to the electronic device 201. The electronic device 201 can provide a requested function or service by processing the received result as it is or additionally. To that end, a cloud computing, distributed computing, or client-server computing technique may be used, for example. While FIG. 2 shows that the electronic device 201 includes the communication interface 270 to communicate with the external electronic device 204 or server 206 via the network 262 or 264, the electronic device 201 may be independently operated without a separate communication function according to some embodiments of this disclosure.

The server 206 can include the same or similar components 210-295 as the electronic device 201 (or a suitable subset thereof). The server 206 can support to drive the electronic device 201 by performing at least one of operations (or functions) implemented on the electronic device 201. For example, the server 206 can include a processing module or processor that may support the processor 220 implemented in the electronic device 201. In certain embodiments, the server 206 performs the natural language processing.

Although FIG. 2 illustrates one example of a network configuration 200 including an electronic device 201, various changes may be made to FIG. 2. For example, the network configuration 200 could include any number of each component in any suitable arrangement. In general, computing and communication systems come in a wide variety of configurations, and FIG. 2 does not limit the scope of this disclosure to any particular configuration. Also, while FIG. 2 illustrates one operational environment in which various features disclosed in this patent document can be used, these features could be used in any other suitable system.

Figure 3:
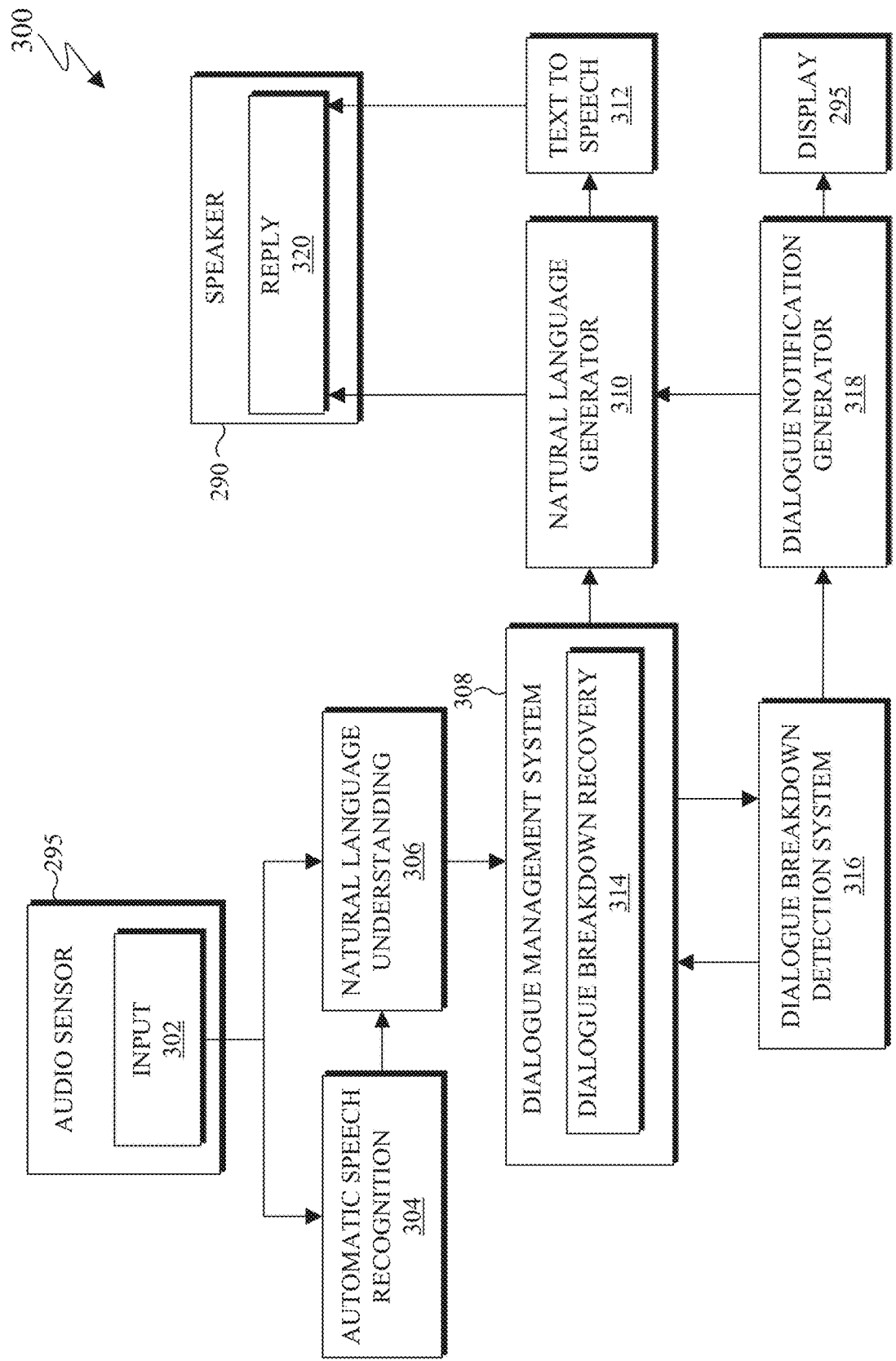
FIG. 3 illustrates an example block diagram of a natural language processing system in accordance with this disclosure.

FIG. 3 illustrates an example block diagram of a natural language processing system 300 in accordance with this disclosure. The natural language processing system 300 is described as being implemented any of the client devices 106-112 or the server 104 of FIG. 1, the electronic device 201 or the server 206 of FIG. 2, a virtual assistant, or any combination thereof. For example, the electronic device 201 of FIG. 2 includes the natural language processing system 300. However, the natural language processing system 300 may be used by any other suitable device(s) and in any other suitable system(s). The natural language processing system 300 is described as being used to perform natural language understanding and dialogue breakdown detection. Upon a detection of a dialogue breakdown, the natural language processing system 300 can notify the user of a dialogue breakdown, recover from the dialogue breakdown, or a combination thereof. However, the natural language processing system 300 may be used to perform any other suitable task.

The natural language processing system 300 is configured to receive an input 302. The input 302 can be received through a microphone such as the audio sensor 295 of FIG. 2. In certain embodiments, the input 302 is text. In certain embodiments, the input 302 is a multimodal natural language input. The input 302 is multimodal when it can be a verbal utterance (as illustrated in FIG. 3) or text. The input 302 is processed by an automatic speech recognition 304, a natural language understanding 306, or both. In certain embodiments, the natural language processing system 300 generates a confidence score to indicate a confidence level associated input 302. For example, the confidence score can be based on the degree of background noise is included in the input 302. For another example, the confidence score can be based on the level of certainty that the entire utterance of the user is included in the input 302, to indicate whether a portion of the utterance is missed.

The ASR 304 can include acoustic models and language models for recognizing the input 302. Language models are trained using specific utterances from within a particular domain context. For example, a language models can be associated with a domain such as movies, while another language model can be associated with a domain such as sports, and the like. The ASR 304 can also generate a confidence score to indicate a confidence level associated with recognizing the input 302.

The NLU 306 can include a domain classification, an intent classification, a slot tagger, embedding, and the like. For example, the NLU 306 can identify the domain of the input 302. The NLU 306 can also generate a confidence score to indicate a confidence level associated with the identified domain. The NLU 306 can also identify a task or request from the input 302. The task can be a goal the user desires the electronic device 201 to perform. For example, if the input 302 is "play country music," the corresponding task is to open a music player, search for, and play music of the requested genera. The NLU 306 can also generate a confidence score to indicate a confidence level associated with the identified task or request from the input 302. The NLU 306 can also tag various words of the input 302 as corresponding to particular slots. The NLU 306 can also generate a confidence score to indicate a confidence level associated with the tagging the input 302 to particular slots.

The dialogue management system 308 can include the dialogue breakdown recovery 314. The dialogue management system 308 can be rule-based, retrieval based, probabilistic based, and the like. The dialogue management system 308 receives various inputs. The inputs can include a speech signal, an utterance (such as the input 302), semantic, external context, multimodal inputs (such as text in addition to a verbal input), and feedback data. For example, the dialogue management system 308 receives the parsed data from the NLU 306. Based on the inputs, the dialogue management system 308 and generates a dataset that represents a reply to the user. The generated reply can request additional inputs 302 from the user or provide the requested information to the user.

The natural language generator 310 transforms the dataset representing the reply to a natural language response to be conveyed or presented to the user. That is, the natural language generator 310 selects words and places the words in a natural language sentence, such that the concepts included in the dataset can be comprehended by the user. By selecting words, the natural language generator 310 generates the reply 320. The reply 320 is conveyed or presented to the user via the speaker 290. In certain embodiments, the reply 320 is displayed on a display, such as the display 260 of FIG. 2.

In certain embodiments, the natural language generator 310 transforms the dataset representing the reply 320 to a natural language text. When the natural language generator 310 generates natural language text that represents the reply 320, the text to speech 312 converts the text into an audio format. The speaker 290 generates sound corresponding to the audio format such that the user can hear the reply 320 via the speaker.

The dialogue breakdown detection system 316 is an attentive memory network with global-local mutual encoding. The dialogue breakdown detection system 316 detects whether a dialogue breakdown occurred between the user and the reply that was generated by the dialogue management system 308. In certain embodiments, the dialogue breakdown detection system 316 detects a breakdown based on utterances of the user as well as generated replies by the dialogue management system 308. In other embodiments, the dialogue breakdown detection system 316 detects a breakdown based on the generated replies by the dialogue management system 308.

Figure 4A:
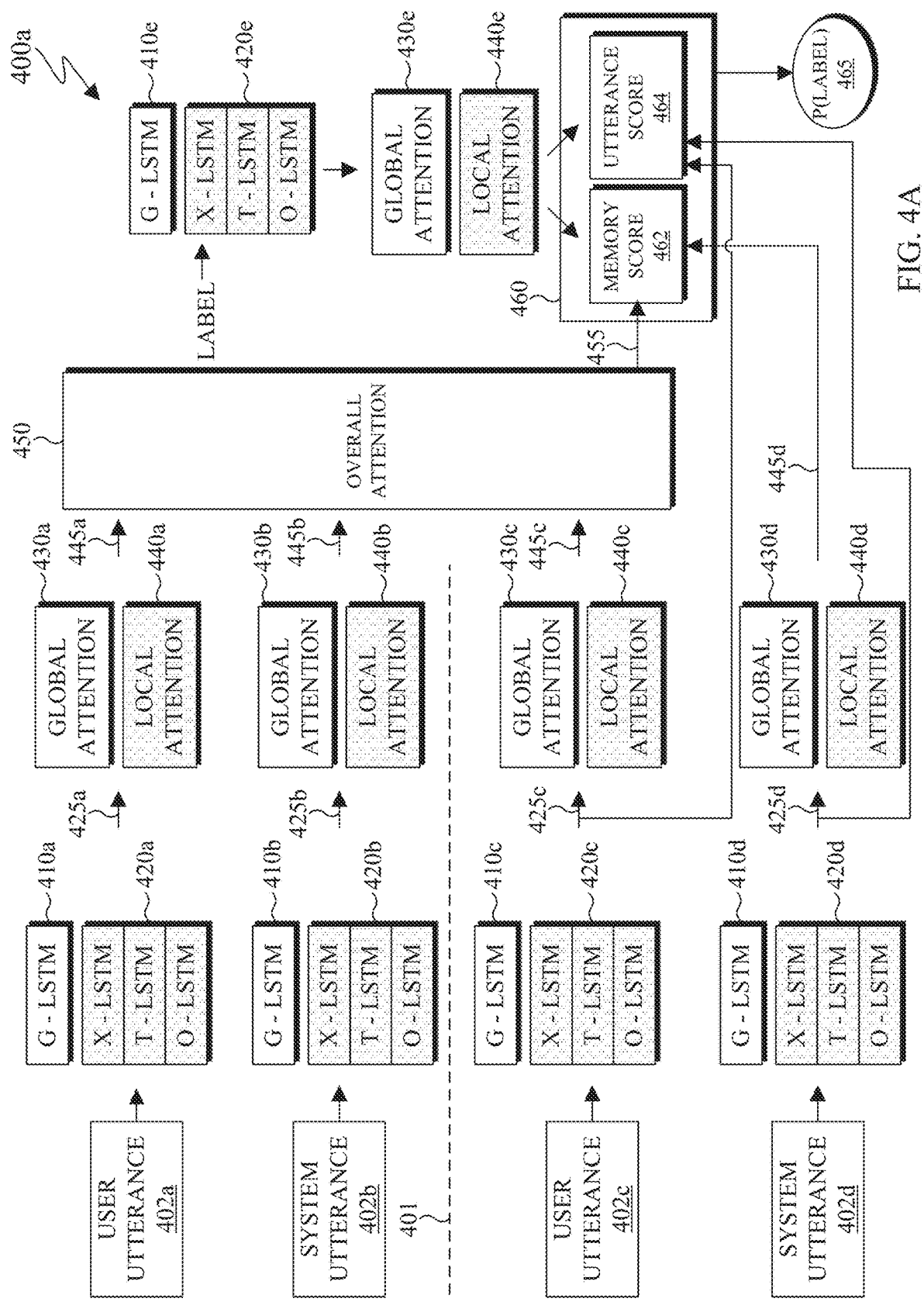
FIG. 4A illustrates an architecture for dialoged breakdown detection in accordance with this disclosure.

In order to detect a dialogue breakdown, the dialogue breakdown detection system 316 monitors the input 302, previous inputs, the generated dataset representing the reply 320, previously generated replies, the output from the ASR 304 (from both the input 302 and previous inputs), the output from the NLU 306 (from both the input 302 and previous inputs), confidence scores associated with the input 302, the ASR 304 and the NLU 306 (from both the input 302 and previous inputs), and the like. FIG. 4A, below, describes an architecture of the dialogue breakdown detection system 316 for detecting whether a breakdown occurred. In certain embodiments, dialogue breakdown detection system 316 uses the confidence scores associated with the input 302, the ASR 304, the NLU 306, or a combination thereof when detecting whether a breakdown occurred. In certain embodiments, the dialogue breakdown detection system 316 uses the confidence scores associated with the input 302, the ASR 304, the NLU 306, or a combination thereof when recovering from a detected dialogue breakdown.

The amount of information that the dialogue breakdown detection system 316 monitors can be fixed or vary. The smaller the window (the less number of utterances the dialogue breakdown detection system 316 monitors) can result in faster processing. However when the window is too small, the dialogue breakdown detection system 316 may be unable to identify a breakdown in the dialogue or incorrectly identify a breakdown in the dialogue due to the limited context that is available to the dialogue breakdown detection system 316. Alternatively, as the size of the window increases (the more utterances that the dialogue breakdown detection system 316 monitors) the historical context that is provided to the dialogue breakdown detection system 316 to correctly identify a breakdown in the dialogue also increases. However a larger window can increase the processing time due to the ever increasing number of utterances the dialogue breakdown detection system 316 would parse in order to identify whether a breakdown in the dialogue occurred.

The dialogue breakdown detection system 316 can include a fixed window that monitors a fixed number of utterances between the user and the electronic device 201 (such as a virtual assistant). In certain embodiments, the fixed window monitors all of the utterances of a single conversation between the user and the virtual assistant. For example, if the context of the dialogue is associated with performing a particular task where the virtual assistant provides multiple replies to gather additional information from the user to perform the requested task, then the amount of information that the dialogue breakdown detection system 316 monitors will continually increase. That is, the longer the conversation, the more utterances that the dialogue breakdown detection system 316 monitors.

In certain embodiments, the fixed window monitors the utterances between the user and the virtual assistant up to a certain number of recent utterances that are associated with the same dialogue event. For example, if the window is fixed such that the dialogue breakdown detection system 316 monitors only three utterances (such as (i) the user speaks requesting for the virtual assistant to perform a particular task, (ii) the virtual assistant replies with a request for additional information, (iii) the user provides the requested information) then for the system to monitor the virtual assistant reply, the system will stop monitoring the first utterance spoken by the user. That is, the dialogue breakdown detection system 316 monitors only the most recent fixed number of utterances.

The dialogue breakdown detection system 316 can include a varying window that monitors different number of utterances based on the situation associated with the dialogue. In certain embodiments, the amount of information that the dialogue breakdown detection system 316 monitors is system dependent. For example, if resources (such as memory and processor) of the system are available, then the amount of information that the dialogue breakdown detection system 316 monitors increases. Alternatively, if the resources of the system are limited or occupied with other tasks, then the amount of information that the dialogue breakdown detection system 316 monitors decreases.

In certain embodiments, the size of the window can be set for each particular domain. That is, the window size is based on the identified domain of the dialogue. For example, a first domains can include a fixed window of a certain size and a second domain can include a fixed window or a different size. If the domain switches during a dialogue between the user and the virtual assistant, then the size of the window can change accordingly.

It is noted that the window size is optimized by either machine learning or a predetermined size for each domain. For example, the dialogue breakdown detection system 316 can learn the size of the window from previous dialogues between the user and the virtual assistant within certain domains.

In certain embodiments, once a breakdown is detected, based on the monitored information, the dialogue breakdown detection system 316 notifies the dialogue management system 308 of the breakdown. The dialogue breakdown recovery 314 attempts to recover from the breakdown based on both the local and global context associated with the dialogue. For example, the dialogue breakdown recovery 314 identifies context that is associated with a state and generates a modified reply based on the context. The state can include a slot, a keyword, a local context (the obtained verbal input or the generated reply), and the like. In certain embodiments, the dialogue breakdown recovery 314 uses the confidence scores associated with the input 302, the ASR 304, the NLU 306, or a combination thereof. For example, the dialogue breakdown recovery 314 uses one or more of the confidence scores when identifying the context that is associated with a state. The dialogue breakdown recovery 314 generates a modified dataset that represents a modified reply to the user. The natural language generator 310 transforms the modified dataset, representing the modified reply, to a natural language response that is to be conveyed or presented to the user.

In certain embodiments, once a breakdown is detected, based on the monitored information, the dialogue breakdown detection system 316, notifies the dialogue notification generator 318. The dialogue notification generator 318 generates a notification which can be displayed on the display 260. The displayed notification can indicate the miscommunication to the user. The dialogue notification generator 318 generates a dataset that represents a message and, when transformed by the natural language generator 310, can be presented to the user via the speaker 290. For example, the notification can indicate an apology for the miscommunication, request that the user repeat their previous utterance, or both. In certain embodiments, the dialogue notification generator 318, using both the local and global context, identifies the utterance that caused the breakdown. Thereafter, the dialogue notification generator 318 can generate a dataset that represents a request to ask the user about the utterance which caused the dialogue breakdown.

In certain embodiments, the dialogue breakdown detection system 316 is included in the dialogue management system 308. For example, when the dataset representing the reply is generated, the dialogue breakdown detection system 316 can determine whether a breakdown occurred, such that the dialogue breakdown recovery 314 can generate a modified dataset prior to presenting the original dataset (that includes the breakdown), representing the original reply, to the user via the speaker 290. That is, a breakdown in the dialogue can be detected before an improper response is given to the user.

Although FIG. 3 illustrates one example of a natural language processing system 300, various changes may be made to FIG. 3. For example, the natural language processing system 300 can receive and process various types of inputs such as text and provide a written reply instead of an audible reply. Also, the tasks performed using the natural language processing system 300 can include the dialogue breakdown detection, recovery, and notification elements while not performing natural language processing.

FIG. 4A illustrates the architecture 400a for dialoged breakdown detection in accordance with this disclosure. FIGS. 4B, 4C, 4D, 4E, 4F, 4G, and 4H illustrate a process for dialoged breakdown detection using the architecture 400a in accordance with this disclosure. The architecture 400a includes a context based memory network. FIGS. 4B, 4C, 4D, 4E, 4F, and 4G, illustrate a detailed process of processing an utterance with a particular label, while FIG. 4H illustrates the process of performing attention over a weighted mixture that was previously obtained such as from the FIG. 4A.

The architecture 400a is described as being included in the dialogue breakdown detection system 316 of FIG. 3. For example, the context based memory network as shown in the architecture 400a can be implemented by any of the client devices 106-112 or the server 104 of FIG. 1 or the electronic device 201 or the server 206 of FIG. 2. The architecture 400a can be included in an electronic device that includes a virtual assistant that can communicate with a user. However, the architecture 400a can be used by any other suitable device(s) and in any other suitable system(s).

The context based memory network as shown in the architecture 400a determines the probability of a dialogue breakdown with respect to a reply that is generated by the system. The context based memory network uses both global and local contextual information from user utterances and system utterances to identify a probability of a label that indicates whether a dialogue breakdown occurred. For example, the context based memory network identifies whether a breakdown occurred with respect to each of the utterances (such as the utterances 402, 402b, 402c, 402d) by classifying each utterance with respect to a label. For example, the context based memory network associates an utterance with different labels and determines which label most correctly characterizes the utterance, based on the local context of the utterance, the global context of the utterance, and any previous utterances. Any number of labels can be used by the architecture 400a. The architecture 400a includes three labels. The number of labels and the description of the labels of the architecture 400a are not limiting. The label X corresponds to a breakdown, the label T corresponds to a possible breakdown, and the label O corresponds to a non-breakdown. In certain embodiments, the labels can be used to identify a dialogue breakdown in cases that were not presented in the training data when the neural network, such as a Long Short Term Memory (LSTM) network or a Bidirectional Long Short Term Memory (BiLSTM) network, was originally trained. A LSTM network includes a memory cell that can maintain information. A LSTM network preserves information from inputs that already passed through in a single direction while a BiLSTM passes an input in two directions, from future to past as well as from past to future. BERT is an example BiLSTM and includes 24 layers (transformer blocks), 1024 hidden size, 16 attention heads, and total number of 340 million parameters.

The architecture 400a is separated into three portions. A first portion is located above the line 401 and represents a previous dialogue pair between the user and the system. The utterances included in the first portion were previously assigned labels. The architecture 400a can include any number of labels that define various aspects of the utterance. As illustrated the architecture 400a includes three labels. The label can be X to indicate a breakdown occurred, T to indicate a possible breakdown occurred, or O to indicate no breakdown occurred. FIGS. 4B through 4G discussed below, describe the dataflow once a label is assigned to a dialogue pair. The utterances above the line 401 are used to generate the global context (context 455) which is used when assigning a label to a new utterance.

A second portion is located below the line 401 and represents a current dialogue pair between the user and the system. The current dialogue pair does not have an assigned label.

The third portion is located to the right of the overall attention 450. The third portion assigns a label to the dialogue pair of the second portion. The third portion is iteratively performed for each label and generates a probability score that is associated with each label that can be assigned to the current dialogue pair. The label with the highest probability score is then assigned to the current dialogue pair. After assigning the label to the current dialogue pair, the current dialogue pair is moved above the line 401 (such that both the previous dialogue pair and the current dialogue pair are above the line and used to generate the context 455) and a new dialogue pair is received and generated by the natural language processing system 300. It is noted that the window size, can limit the number of dialogue pairs that are positioned above the line 401. For example, if the window is limited to four dialogue pairs, (either because the window is fixed to that size or the domain indicates that four dialogue pairs is sufficient to detect a breakdown) then only the most recent four dialogue pairs are maintained above the line. The oldest dialogue pair is discarded each time a new dialogue pair is assigned a label and moved above the line 401.

The inputs into the context based memory network, as shown in the architecture 400a include a user utterance (such as the user utterance 402a) and a system utterance (such as the system utterance 402b). The user utterance can be the input 302 and the system utterance can be the dataset generated by the dialogue management system 308 of FIG. 3. In certain embodiments, the system utterance can be the reply 320 that is presented to the user via the speaker 290 of FIG. 3.

The embedding of the input is passed to a global-local LSTM network or global-local BiLSTM network (such as the global BiLSTM 410a and the local BiLSTM 420a). The local BiLSTM 420a can include multiple local BiLSTM networks 420a that are trained with respect to the various labels. A global attention (such as global attention 430a), local attention (such as local attention 440a), and an overall attention (such as the overall attention 4450) identifies the local context and the global context of the input. The context based memory network then calculates a probability score of a label associated with the current utterance (such as the system utterance 402d) based on local context and the global context.

A dialogue between a user and a system (such as a virtual assistant), as illustrated in the architecture 400a, is composed of multiple dialogue pairs. Each dialogue pair will include a user utterance and a reply by the system. A label is applied to each dialogue pair in order to determine a breakdown. For example, a first dialogue pair can be the user stating "HELLO SYSTEM" and the system generating a reply acknowledging the user. The second dialogue pair can be the user asking the system to provide information (such as the current weather) or perform a particular task (such as turn on an appliance, play a certain genera of music, book an airplane ticket, and the like). Thereafter, the system will generate a reply that provides the requested information, indicates the task is complete, or request additional information. The dialogue will continue with a user providing an utterance followed by a system generating an utterance until the user stops providing new utterances.

The user utterance 402a can be the initial utterance which includes a request for information or a request to perform a particular a task. Alternatively, the user utterance 402a is an utterance in the middle of a dialogue between the user and the virtual assistant. The system utterance 402b can be generated by the dialogue management system 308 of FIG. 3. The system utterance 402b is a reply to the user which can include the requested information or an indication that the requested task is complete. The system utterance 402b can also be a reply that requests additional information from the user. The user utterance 402c is a second utterance from the user to the virtual assistant. The user utterance 402c can include the additional information requested by the user. The system utterance 402d can include the requested information or an indication that the requested task is complete. The system utterance 402d can also be a reply that requests additional information from the user. It is noted that the user utterance 402a and the system utterance 402b represent a first dialogue pair, while the user utterance 402c and the system utterance 402d represent a second dialogue pair.

The user utterances 402a, and 402c as well as the system utterances 402b and 402d represent a dialogue between the user and the virtual assistant. The quantity of utterances that occur between the user and the virtual assistant are not limited to the number of utterances as illustrated in FIG. 4A. It is noted that the user utterances 402a and 402c can be received by the electronic device 201 via the audio sensor 295 of FIG. 2, while the system utterances 402b and 402d can be audible sounds produced by the speaker 290 of FIG. 2 and generated by the dialogue management system 308 of FIG. 3.

The context based memory network as shown in the architecture 400a includes a global-local attentive encoder. The global-local attentive encoder includes (i) an embedder, (ii) global and local BiLSTM network, and (ii) global and local self-attention layers. In certain embodiments, the embedding, global and local BiLSTM networks, and the global and local self-attention layers are different components.

The global BiLSTM network 410a, 410b, 410c, and 410d (collectively global BiLSTM network 410) are neural networks that include a memory cell that can maintain information for a period of time. Similarly, the local BiLSTM network 420a, 420b, 420c, and 420d (collectively 420) are neural networks that also include a memory cell that can maintain information for a period of time. The memory component of the BiLSTM network enables the context based memory network to consider context from previous utterances (by the user or the virtual agent) throughout the entirety of the dialogue. The global and local BiLSTM network 410 and 420 can include one or more forget gates, one or more block gates, one or more input gates, one or more output gates, and the like. The global BiLSTM and the local BiLSTM networks can include an encoder such as BERT, ROBERTA, XLNET, T5, ERNIE, and the like.

The global BiLSTM network 410 embeds and encodes either the current user utterance or the system utterance. Additionally, if available, the global BiLSTM network 410 embeds and encodes any previous user and system utterances. The global BiLSTM network 410 is local guided encoders that learn global embedding based on the local embedding. The global BiLSTM network 410 converts the user or system utterance to a vector which includes a set of numbers, where the numbers represent the words of the utterance. Each of the global BiLSTM network 410 networks process a single utterance. For example, the global BiLSTM network 410a processes the user utterance 402a, the global BiLSTM network 410b processes the system utterance 402b, the global BiLSTM network 410c processes the user utterance 402c, and the global BiLSTM network 410n processes the system utterance 402d.

The local BiLSTM network 420 embeds and encodes either the current user utterance or the system utterance with respect to a particular label. The local BiLSTM network 420 is a global guided local encoder that learns the local embedding based on the global embedding. The local BiLSTM network 420 converts the user or system utterance to a vector which includes a set of numbers, where the numbers represent the words of the utterance.

In certain embodiments, the local BiLSTM network 420 includes multiple local BiLSTM networks 420 that are each trained based on a particular label. The number of local BiLSTM networks 420 corresponds to the number of labels. Since the architecture 400a can include any number of labels, the number of local BiLSTM networks 420 changes accordingly. As illustrated, the architecture 400a uses three labels, X, T, and O. As illustrated, the label X indicates a breakdown occurred, the label, the label T indicates a possible breakdown occurred, and the label O indicates no breakdown occurred. When the utterance is assigned a certain label (such as the utterances above the line 401), the local BiLSTM network 420 that corresponds to the assigned label processes the utterance. When the utterance is not yet assigned a certain label (such as the utterances below the line 401), all of the local BiLSTM networks 420 processes the utterance.

The local BiLSTM network 420 processes the current utterance while the global BiLSTM network 410 processes current utterance and, if available, any previous utterances. For example, an utterance with a label is processed by the global BiLSTM network 410 and is also processed by one of the local BiLSTM network 420 that corresponds to the label. An utterance that does not have a label is processed by the global BiLSTM network 410 and is all of the local BiLSTM networks 420. That each of the utterances (such as 402a, 402b, 402c, through 402d) are processed by one global BiLSTM networks and at least one local BiLSTM networks.

The weighted mixtures 425a, 425b, 425c, and 425d (collectively the weighted mixture 425) combine the output of the respective the global BiLSTM networks 410 and the local BiLSTM networks 420. For example, the weighted mixture 425a combines the output of the global BiLSTM network 410a and one of the local BiLSTM network 420a (that corresponds to the label associated with the user utterance 402a), to generate a combined global-local BiLSTM state that enters the global attention 430a and the local attention 440a. For another example, the weighted mixture 425d combines the output of the global BiLSTM network 410d and all of the local LSTM network 420d (since the system utterance 402d, is not yet assigned a label) to generate a combined global-local BiLSTM state that enters the global attention 430d and the local attention 440d. The weighted mixture 425 takes a weighted average of the output the global BiLSTM network 410 and the local BiLSTM network 420.

The global attention 430a, 430b, 430c, and 430d (collectively 430) and the local attention 440a, 440b, 440c, and 440d (collectively 440) concentrate on a particular utterance to identify which portion of the utterance is important. For example, the global attention 430a and the local attention 440a are associated with the user utterance 402a, while the global attention 430b and the local attention 440b are associated with the user utterance 402b.

The global attention 430 analyzes the current and previous vectors (the current and previous utterances) while the local attention 440 analyzes the current vector (corresponding to a current utterance). The global attention 430 and the local attention 440 are not specific to any label associated with an utterance. The global attention 430 identifies important portions of the current utterance and previous utterances while the local attention 440 identifies important portions of the current utterance.

The weighted mixtures 445a, 445b, 445c, and 445d (collectively the weighted mixture 445) combine the output of the respective the global attention 430 and the local attention 440. In certain embodiments, the weighted mixture 445 takes a weighted linear combination of the output of the global attention 430 and the local attention 440. For example, the weighted mixture 445 multiples a first variable to the output of the global attention 430 and a second variable to the output of the local attention 440, and the sums the values together. In certain embodiments, the weighted mixture 445 takes a weighted average of the output the global attention 430 and the local attention 440.

The overall attention 450 attends over the history of all of the utterances (based on the all of the weighted mixtures 445). The overall attention 450 generates the context 455. The amount of history that the overall attention 450 attends is based on the window size. As described above the overall attention 450 can include a fixed or variable window. The overall attention 450 identifies the important aspects of the utterances that are to be used to detect a breakdown.

The third portion of the architecture 400a assigns a label to the system utterance 402d by selecting a label with the highest probability. That is the third portion of the architecture 400a generates an output 465 for each of the labels, where the output indicates a probability that the utterance 402d falls within one of the three labels. The output 465 is the probability that is associated with each of the labels with respect to an utterance.

To generate the output 465 that is associated with the system utterance 402d, the system utterance 402d is processed with respect to each label. For example, during the first iteration, the system utterance 402d is processed by the global BiLSTM network 410e and the local BiLSTM network 420e with respect to the X label. A weighted mixture of the output is the processed by the global attention 430e and the local attention 440e. A weighted mixture of that output is then inputted into the scorer 460. The scorer 460 generates two scores that are weighted and normalized to generate the first output 465 which is a probability associated with the X label. After generating the probability associated with the X label, the second iteration commences such that the system utterance 402d is processed by the global BiLSTM network 410e and the local BiLSTM network 420e with respect to the T label. A second output 465 is generated corresponding to a probability associated with the T label. After generating the probability associated with the X and T labels, the third iteration commences such that the system utterance 402d is processed by the global BiLSTM network 410e and the local BiLSTM network 420e with respect to the O label. A third output 465 is generated corresponding to a probability associated with the O label. The label with the highest probability is selected and assigned to the user utterance 402c and the system utterance 402d. Thereafter the user utterance 402c and the system utterance 402d are moved above the line 401 and a new dialogue pair is located below the line 401.

The scorer 460 includes a memory score 462 and an utterance score 464. The memory score 462 attends over the context 455 (which includes the global context generated by the overall attention 450), taking into account the weighted mixture 445d that associated with the system utterance 402d and the current label (which is based on the particular local BiLSTM network 420e). For example, the memory score 462 generates a score for a label that indicates the probability of a particular label, given the history of the utterances.

The utterance score 464 attends over the current system utterance 402d (based on the weighted mixture 425d of the system utterance 402d) taking into account the weighted mixture 425c of the user utterance 402c and the label (which is based on the particular local BiLSTM network 420e). For example, the utterance score 464 generates a score for a label that indicates the probability that the current label corresponds to the current utterance based on the user utterance 402c.

After the memory score 462 and the utterance score 464 are generated the scorer 460 generates the output 465 based on a weighted sum of the memory score 462 and the utterance score 464. The weighted sum of the memory score 462 and the utterance score 464 can be normalized by a sigmoid function to estimate a probability associated with the input label. The label with the highest probability is assigned to the user utterance 402c and the system utterance 402d.

Equation (1) describes generating the weighted mixture 425, the weighted mixture 445, and the weighted sum of the memory score 462 and the utterance score 464. As shown in equation (1) the weights are variables that are applied to the outputs of the various elements of the architecture 400a. It is noted that the weights applied to the weighted mixture 425 can be different than the weights applied to the weighted mixture 445. The expression G of Equation (1) corresponds to the output of the Global BiLSTM network 410, the output of the global attention 430, or the output of the memory score 462. The expression L of Equation (1) corresponds to the output of the local BiLSTM network 420, the output of the local attention 440, or the output of the utterance score 464. Equation 1:

$$\text{weighted mixture} = W_1 G + W_2 L \quad (1)$$

When generating the weighted mixture 425, the weighted mixture 445, and the weighted sum of the memory score 462 and the utterance score 464 the weights can change. The weights are predetermined. In certain embodiments, the weights are constant throughout a dialogue. In certain embodiments, the weights can change during a dialogue such that as more utterances occur, the weights can change. For example, based on the number of utterances the weights applied during the weighted mixture 425a can be different than the weights applied during the weighted mixture 425d. When there are no previous utterances, more emphasis can be placed on the global BiLSTM network 410a than on the local BiLSTM network 420a. In contrast at the weighted mixture 425d there are previous utterances and as such more emphasis can be placed on the local BiLSTM network 420d network than on the global BiLSTM network 410d. Similarly, more weight can be applied to the utterance score 464 than the memory score 462 based on the number of utterances. As the number of utterances increase, the weight can shift and more weight is applied to the memory score 462 than the utterance score 464.

After generating the probability that is associated with each label, the label with the highest probability is assigned to the dialogue pair. If the label indicates that there is no breakdown (label O), then that that dialogue pair is moves above the line 401. If the label indicates that there is a possible breakdown (label T), then that that dialogue pair is moves above the line 401. If the label indicates that there is a breakdown (label X), then that that dialogue pair is moves above the line 401. Additionally, or alternatively, if the label indicates that there is a breakdown (label X), then the dialogue breakdown detection system 316 notifies the dialogue management system 308 to either generate a new reply via the dialogue breakdown recovery 314, or notifies the dialogue notification generator 318, or both.

Figure 4B:
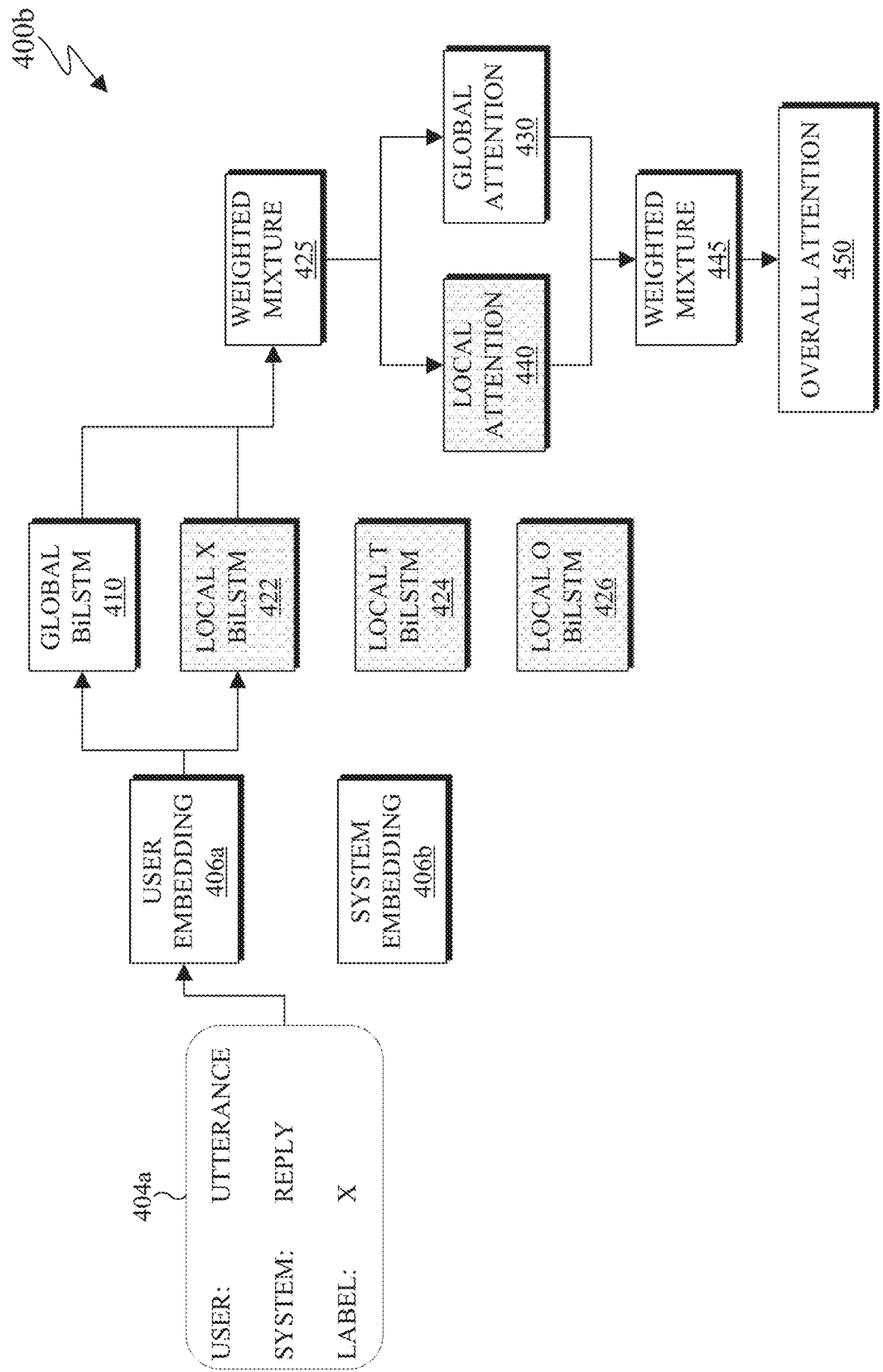
FIGS. 4B, 4C, 4D, 4E, 4F, 4G, and 4H illustrate a process for dialoged breakdown detection using the context based memory network in accordance with this disclosure.
Figure 4C:
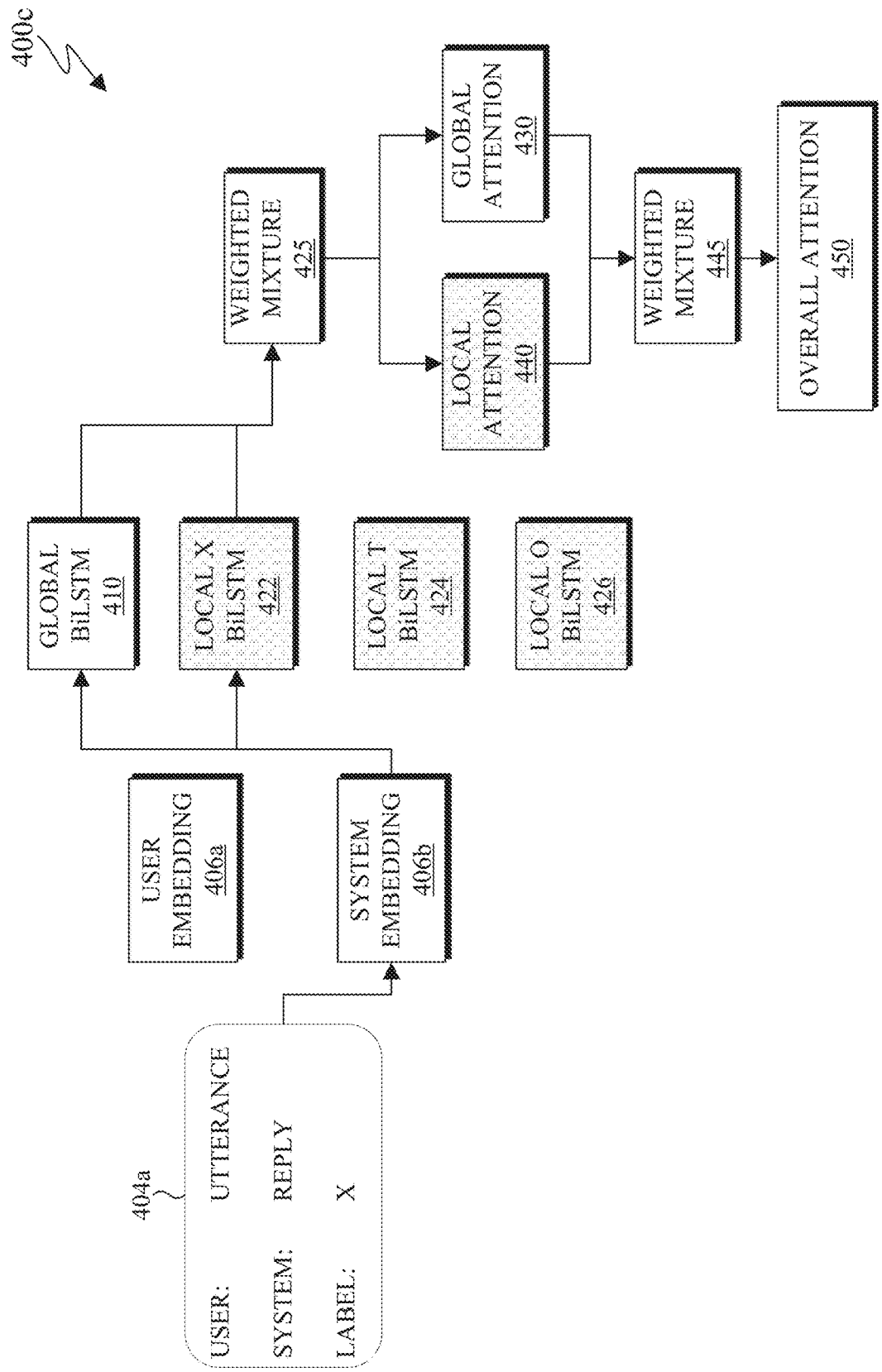
Figure 4D:
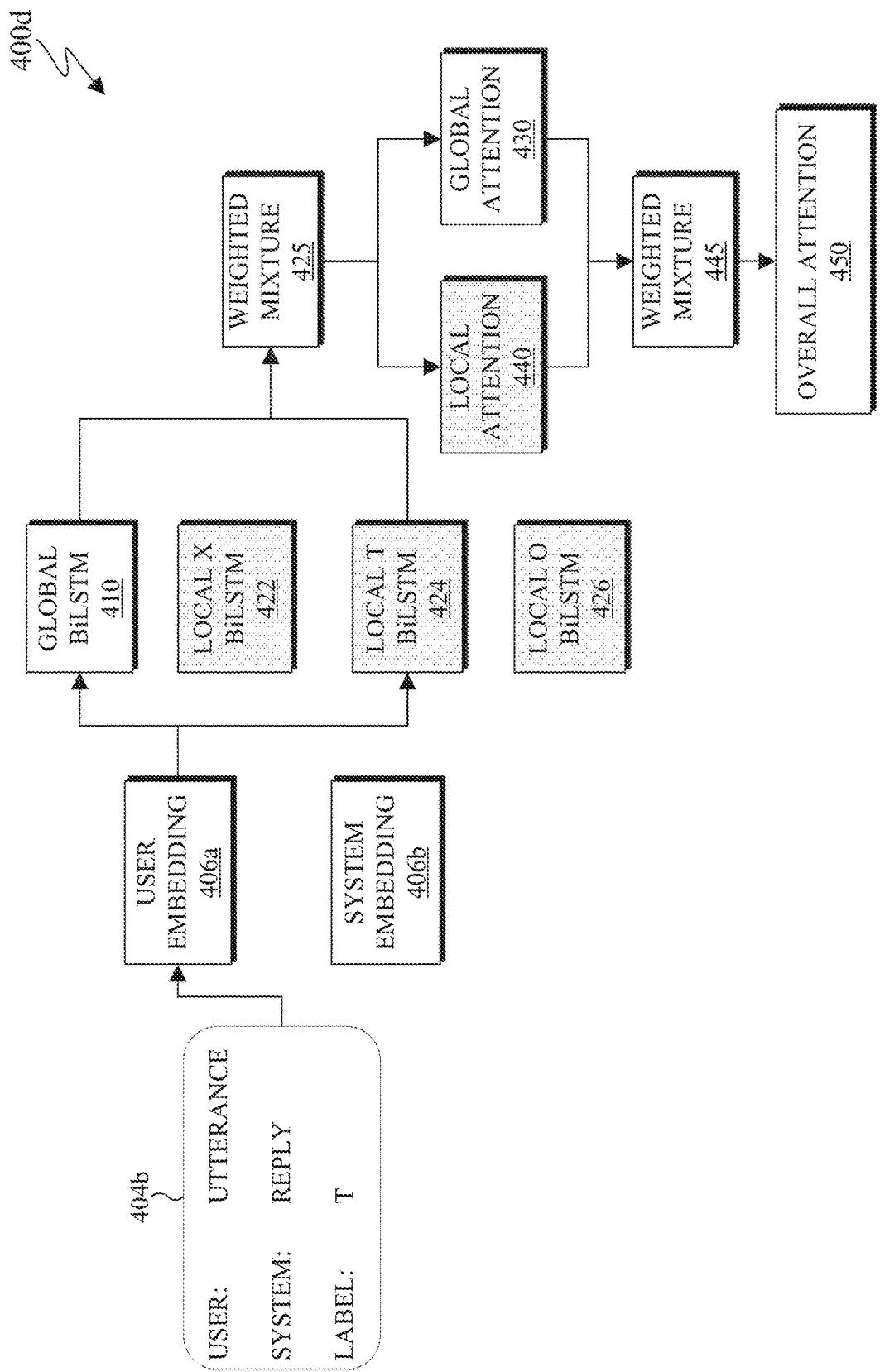
Figure 4E:
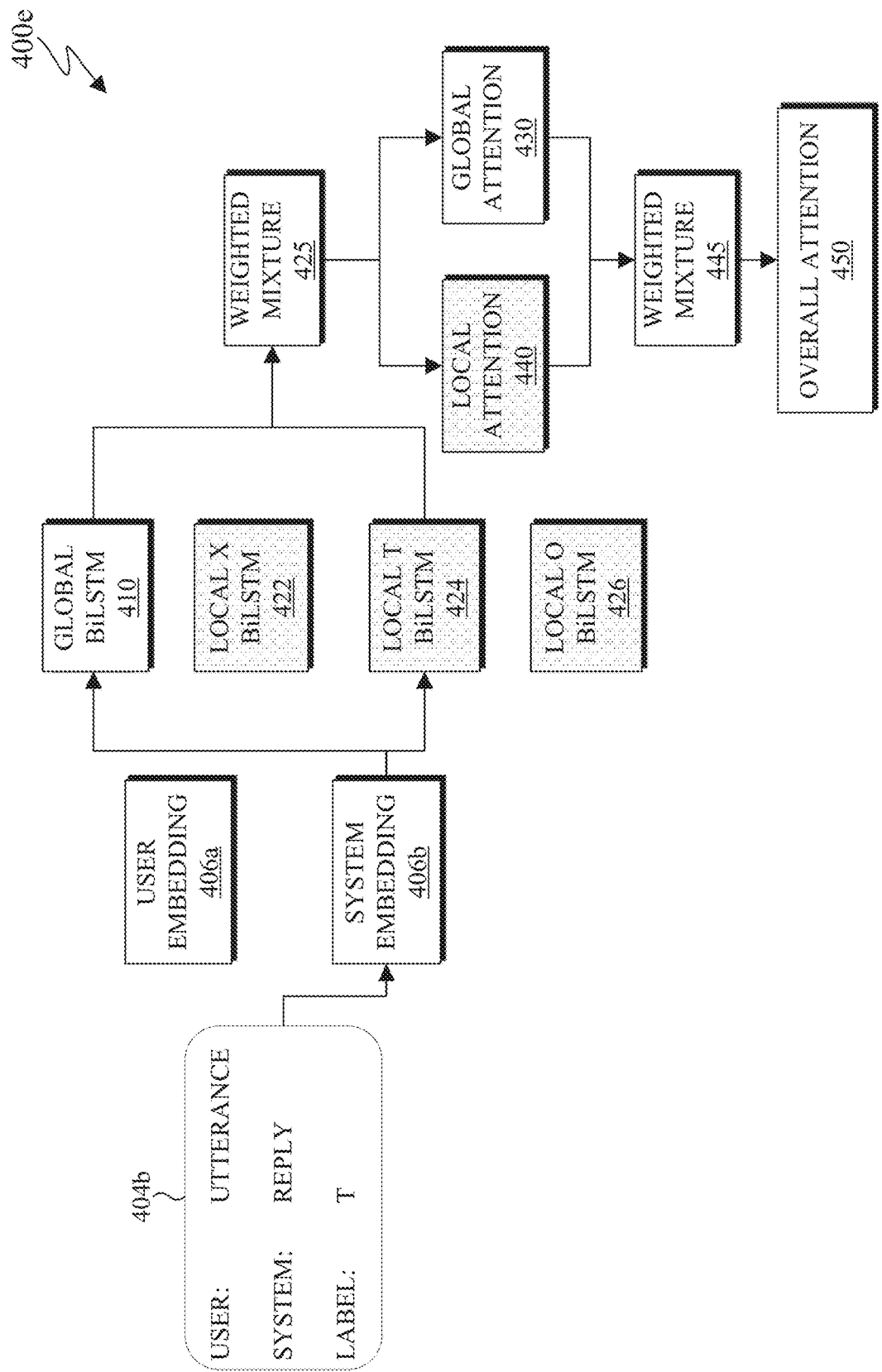
Figure 4F:
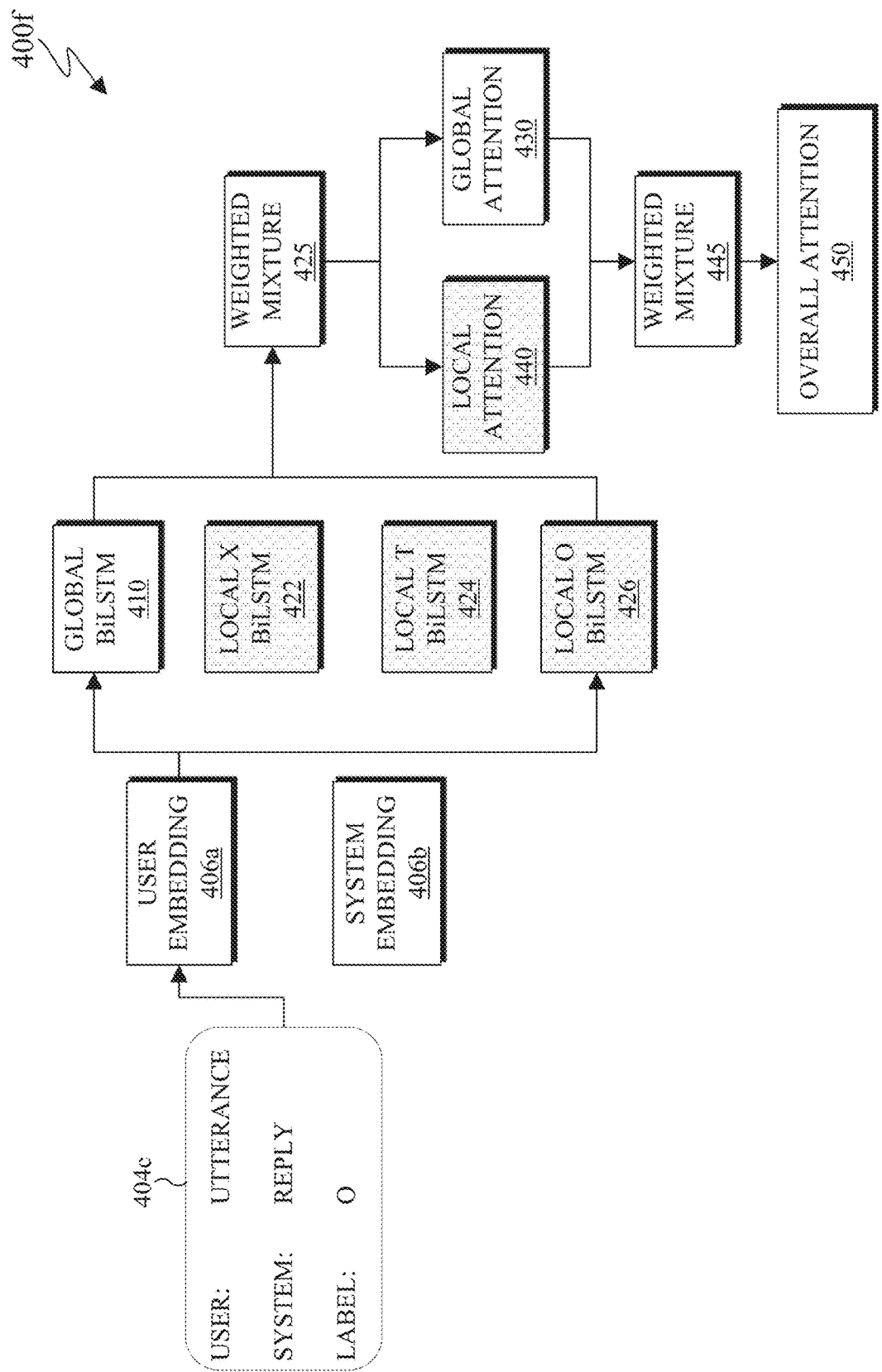
Figure 4G:
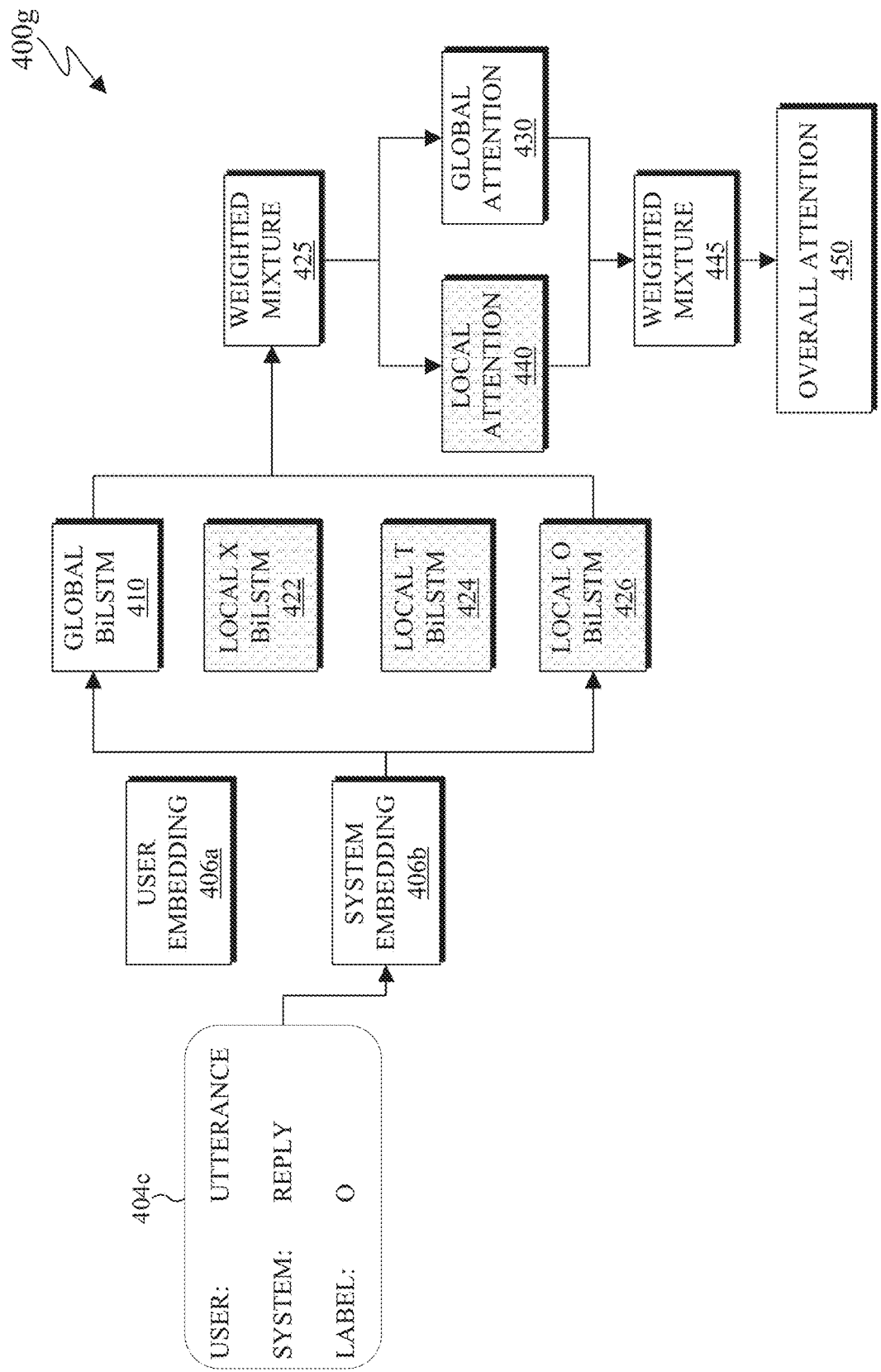
Figure 4H:
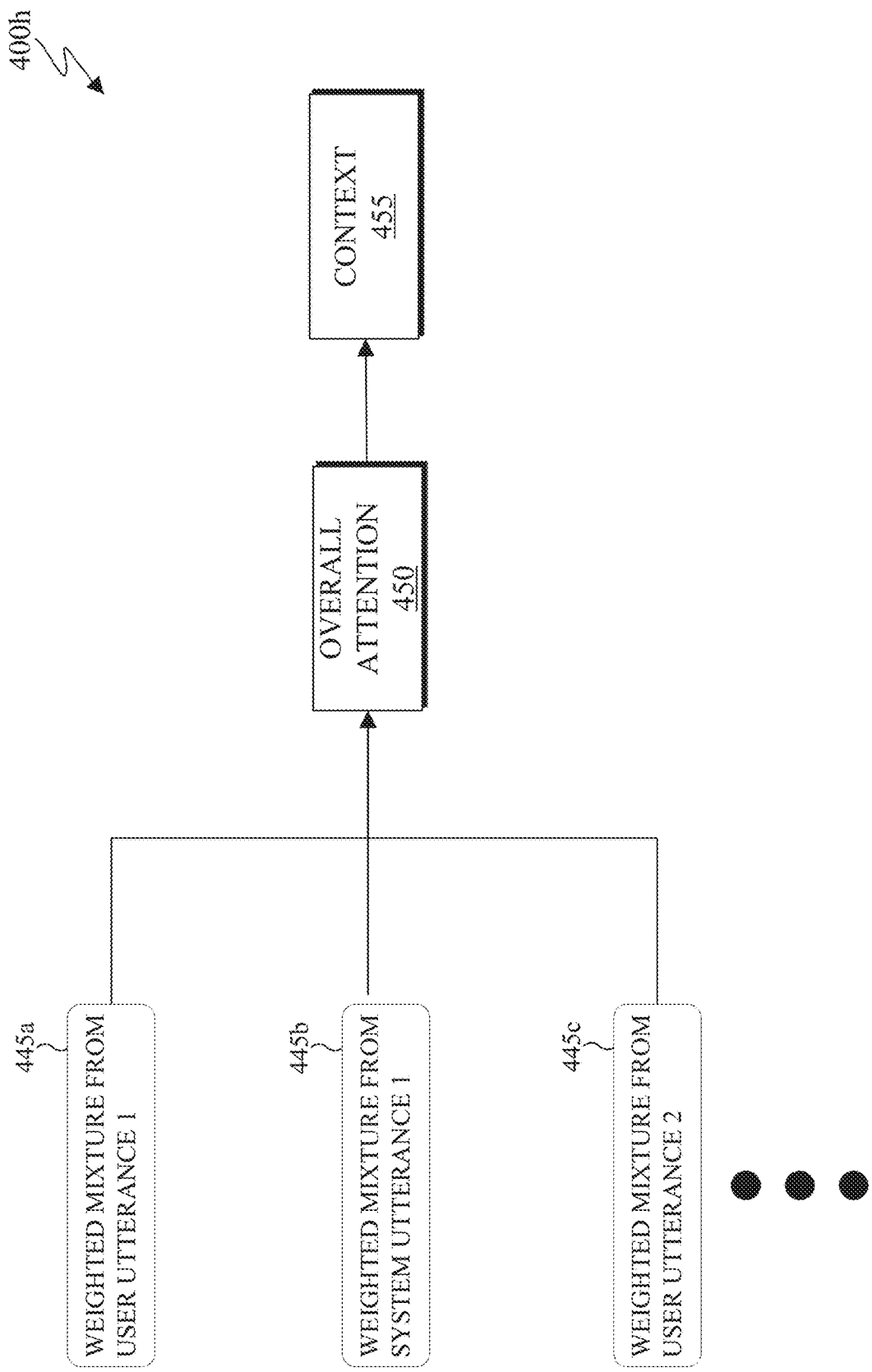

FIGS. 4B through 4G describe an example of using various a dialogue pairs with different labels, as an input into the overall attention 450 (that identifies the context 455 which is used when generated the probability of a label with respect to future dialogue pairs). FIGS. 4B and 4C illustrate environment 400b and 400c, respectively, and describe a dialogue pair 404a that was assigned a label X indicating that there is breakdown. FIGS. 4D and 4E illustrate environment 400d and 400e, respectively, and describe a dialogue pair 404b that was assigned a label T indicating that there is a possibility of a breakdown. FIGS. 4F and 4G illustrate environment 400f and 400g, respectively, and describe a dialogue pair 404c that was assigned a label O indicating that there was no breakdown.

The dialogue pair 404a of FIGS. 4B and 4C can include a user utterance of "TELL ME ABOUT PICNICS" and a system reply of "TODAY IS MONDAY." A dialogue breakdown occurred since the reply generated by the system does not respond to the inquiry of the user. The user utterance of the dialogue pair 404a is embedded using the user embedding 406a. The global BiLSTM network 410 and the local BiLSTM network 422 corresponding to the X label processes the embedding of the user utterance. The weighted mixture 425 generates a weighted sum of the output of global BiLSTM network 410 and the output of local BiLSTM network 422. The global attention 430 and the local attention 440 identify key words. The weighted mixture 445 generates a weighted sum of the output of global attention 430 and the output of local attention 440. The weighted mixture based on the user utterance of the dialogue pair 404a is provided to the overall attention 450.

Similarly, the system utterance of the dialogue pair 404a is embedded using the system embedding 406b. The global BiLSTM network 410 and the local BiLSTM network 422 corresponding to the X label processes the embedding of the system utterance. The weighted mixture 425 generates a weighted sum of the output of global BiLSTM network 410 and the output of local BiLSTM network 422. The global attention 430 and the local attention 440 identify key words. The weighted mixture 445 generates a weighted sum of the output of global attention 430 and the output of local attention 440. The weighted mixture based on the system utterance of the dialogue pair 404a is provided to the overall attention 450.

The dialogue pair 404b of FIGS. 4D and 4E can include a user utterance of "TELL ME ABOUT PICNICS" and a system reply of "SURE, WHERE WOULD YOU LIKE TO GO?" A dialogue breakdown may have occurred since the reply of the system does not directly address the inquiry of the user nor does the reply of the system not respond to the inquiry of the user. As such, as indicated by the label T, a possibility of a breakdown occurred in the dialogue pair 404b.

The user utterance of the dialogue pair 404b is embedded using the user embedding 406a. The global BiLSTM network 410 and the local BiLSTM network 422 corresponding to the T label processes the embedding of the user utterance. The weighted mixture 425 generates a weighted sum of the output of global BiLSTM network 410 and the output of local BiLSTM network 422. The global attention 430 and the local attention 440 identify key words. The weighted mixture 445 generates a weighted sum of the output of global attention 430 and the output of local attention 440. A weighted mixture based on the user utterance of the dialogue pair 404b is provided to the overall attention 450.

Similarly, the system utterance of the dialogue pair 404b is embedded using the system embedding 406b. The global BiLSTM network 410 and the local BiLSTM network 422 corresponding to the T label processes the embedding of the system utterance. The weighted mixture 425 generates a weighted sum of the output of global BiLSTM network 410 and the output of local BiLSTM network 422. The global attention 430 and the local attention 440 identify key words. The weighted mixture 445 generates a weighted sum of the output of global attention 430 and the output of local attention 440. The weighted mixture based on the system utterance of the dialogue pair 404b is provided to the overall attention 450.

The dialogue pair 404c of FIGS. 4F and 4G can include a user utterance of "TELL ME ABOUT PICNICS" and a system reply of "PICNICS ARE FUN WHEN YOU GO WITH FRIENDS OR FAMILY. WOULD YOU LIKE TO KNOW THE TOP PICNIC LOCATIONS IN YOUR AREA" A dialogue breakdown did not occur as the system directly responded to the inquiry of the user. As such, as indicated by the label O, no breakdown occurred in the dialogue pair 404c.

The user utterance of the dialogue pair 404c is embedded using the user embedding 406a. The global BiLSTM network 410 and the local BiLSTM network 422 corresponding to the O label processes the embedding of the user utterance. The weighted mixture 425 generates a weighted sum of the output of global BiLSTM network 410 and the output of local BiLSTM network 422. The global attention 430 and the local attention 440 identify key words. The weighted mixture 445 generates a weighted sum of the output of global attention 430 and the output of local attention 440. A weighted mixture based on the user utterance of the dialogue pair 404c is provided to the overall attention 450.

Similarly, the system utterance of the dialogue pair 404c is embedded using the system embedding 406b. The global BiLSTM network 410 and the local BiLSTM network 422 corresponding to the O label processes the embedding of the system utterance. The weighted mixture 425 generates a weighted sum of the output of global BiLSTM network 410 and the output of local BiLSTM network 422. The global attention 430 and the local attention 440 identify key words. The weighted mixture 445 generates a weighted sum of the output of global attention 430 and the output of local attention 440. The weighted mixture based on the system utterance of the dialogue pair 404c is provided to the overall attention 450.

FIG. 4H illustrates the process of performing the overall attention 450 using multiple weighted mixtures that were previously obtained. For example, the weighted mixture 445a of FIG. 4A corresponds to the weighted mixture from the first user utterance. The weighted mixture 445b of FIG. 4A corresponds to the weighted mixture from the first system utterance. The weighted mixture 445c of FIG. 4A corresponds to the weighted mixture from the second user utterance. The overall attention 450 identifies the context 455 from the multiple weighted mixtures. Once the architecture 400a identifies a label for the system utterance 402d, and a new dialogue pair is obtained, a weighted mixture corresponding to the system utterance 402d and the assigned label will be an additional input into the overall attention 450.

Although FIGS. 4A-4H illustrates one example of the architecture 400a, various changes may be made to the FIGS. 4A-4H. For example, the architecture 400a can include more than three labels. For another example, the architecture 400a can include less than three labels. Also, the tasks performed using the architecture 400a, can be included in the dialogue breakdown detection system 316 of the electronic device 201, or located on a remote device, such as the server 206.

Figure 5:
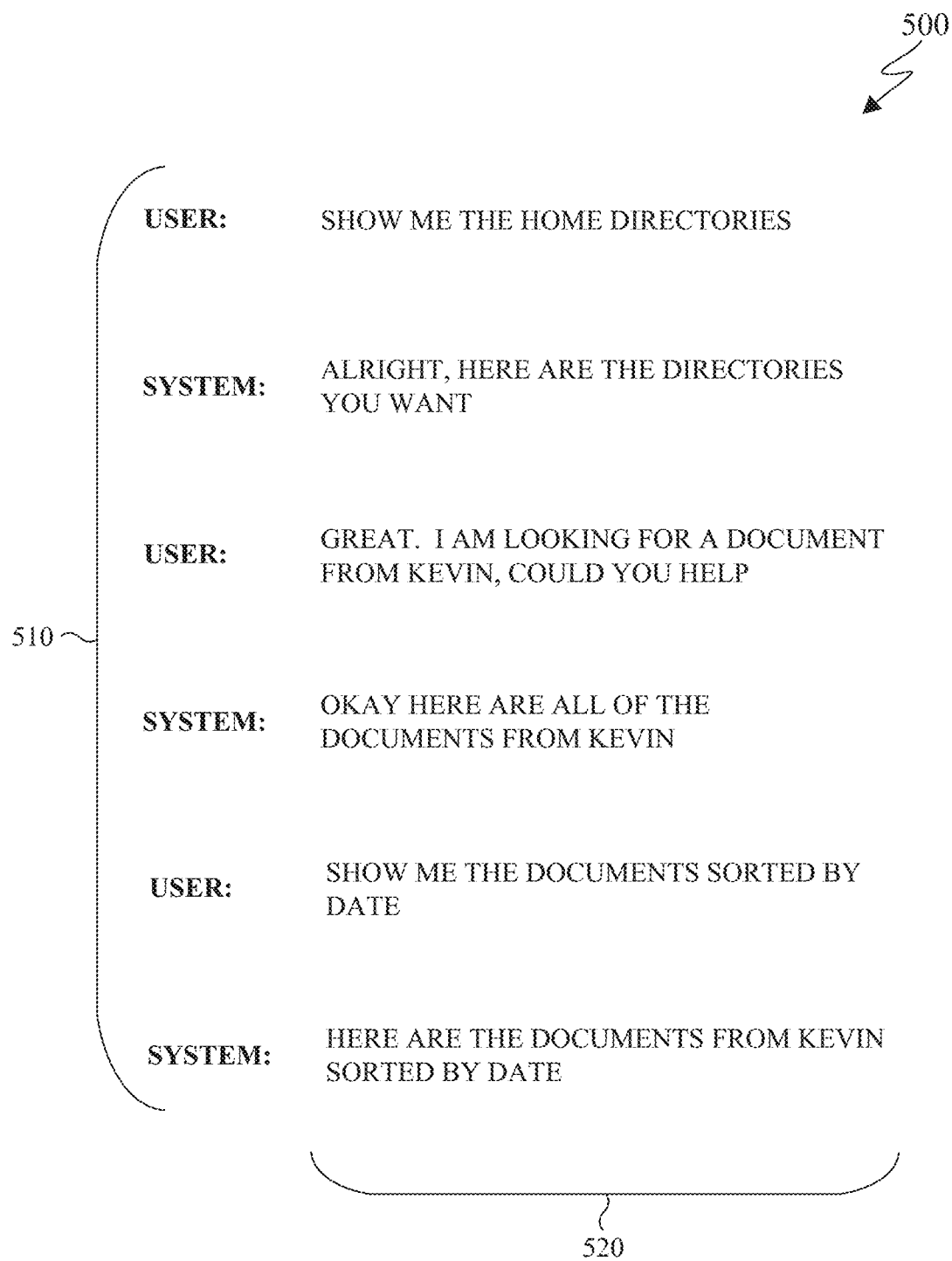
FIG. 5 illustrates an example dialogue distinguishing between local and global context in accordance with this disclosure.

FIG. 5 illustrates an example dialogue 500 that distinguishes between local and global context in accordance with this disclosure. The dialogue 500 could, for example, represent a set of utterances that are used in the architecture 400a of FIG. 4A.

The dialogue 500 includes global context 510 and local context 520. The global context 510 corresponds to multiple utterances while the local context 520 corresponds to a particular utterance. For example, the local context 520 can include "HERE ARE THE DOCUMENTS FROM KEVEN SORTED BY DATE."

The global context 510 can be a fixed or changeable based on the size of the window. For example, the size of the global context can continually increase as the quantity of utterances increases with each new utterance that is generated by the system or received via the user. The global context 510 can be fixed and include a certain number of utterance, such as six utterances. For example, if a new utterance is obtained from a user, the initial user utterance of "SHOW ME THE HOME DIRECTORIES" would then be removed from the global context. As discussed above the size of the window can change based on an identified domain of the dialogue. In certain embodiments, if the size of the window is based on the domain and the domain changes during a dialogue, which causes the size of the window to change, the size of the global context would change accordingly.

Figure 6:
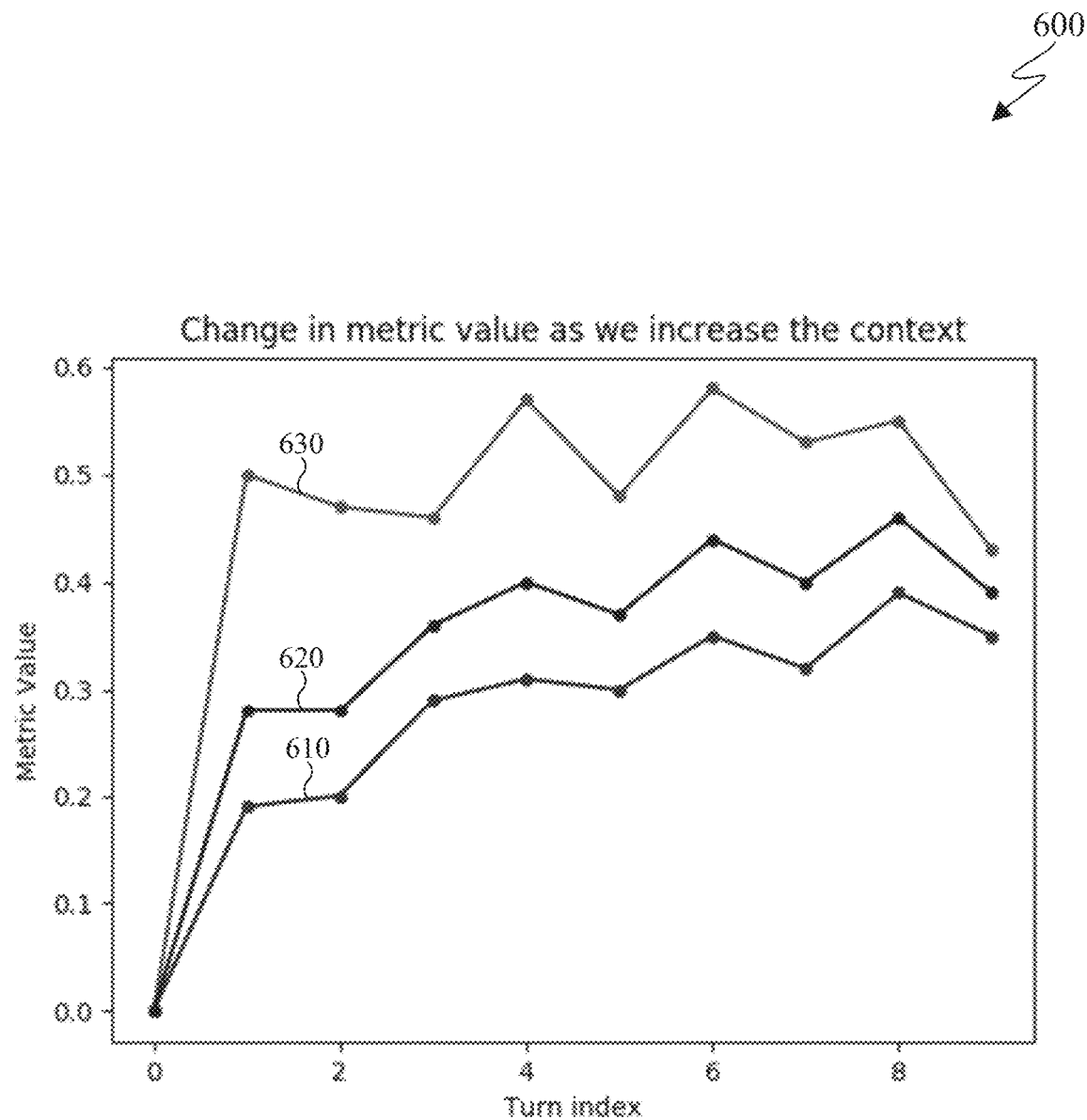
FIG. 6 illustrates a graph in accordance with this disclosure.

Although FIG. 5 illustrates one example dialogue, various changes may be made to FIG. 6. For example, dialogue 500 could include a breakdown. For another example the dialogue 500 could include a larger or a smaller global context 510.

FIG. 6 illustrates a graph 600 in accordance with this disclosure. Although FIG. 6 illustrates one example graph, various changes may be made to FIG. 6.

The graph 600 compares the implementation of the dialogue breakdown detection system 316 of FIG. 3 that uses both the global and the local context of a dialogue to two other breakdown detection systems. The graph 600 relates the number of turns to a metric value. The number of turns corresponds to the number of utterances within a dialogue.

Line 610 identifies the success rate of a first breakdown detection method (denoted as Recall) over a number of turns, line 620 indicates the success rate of a second breakdown detection method (denoted as F-Method), over the number of turns, and line 630 indicates the success rate of the disclosed breakdown detection method (using the global local context as described in architecture 400a) over the number of turns. As illustrated the line 630 has the highest metric value at each new utterance indicating that the global local context, as described in FIG. 4A, outperforms other context based breakdown detection models.

Figure 7:
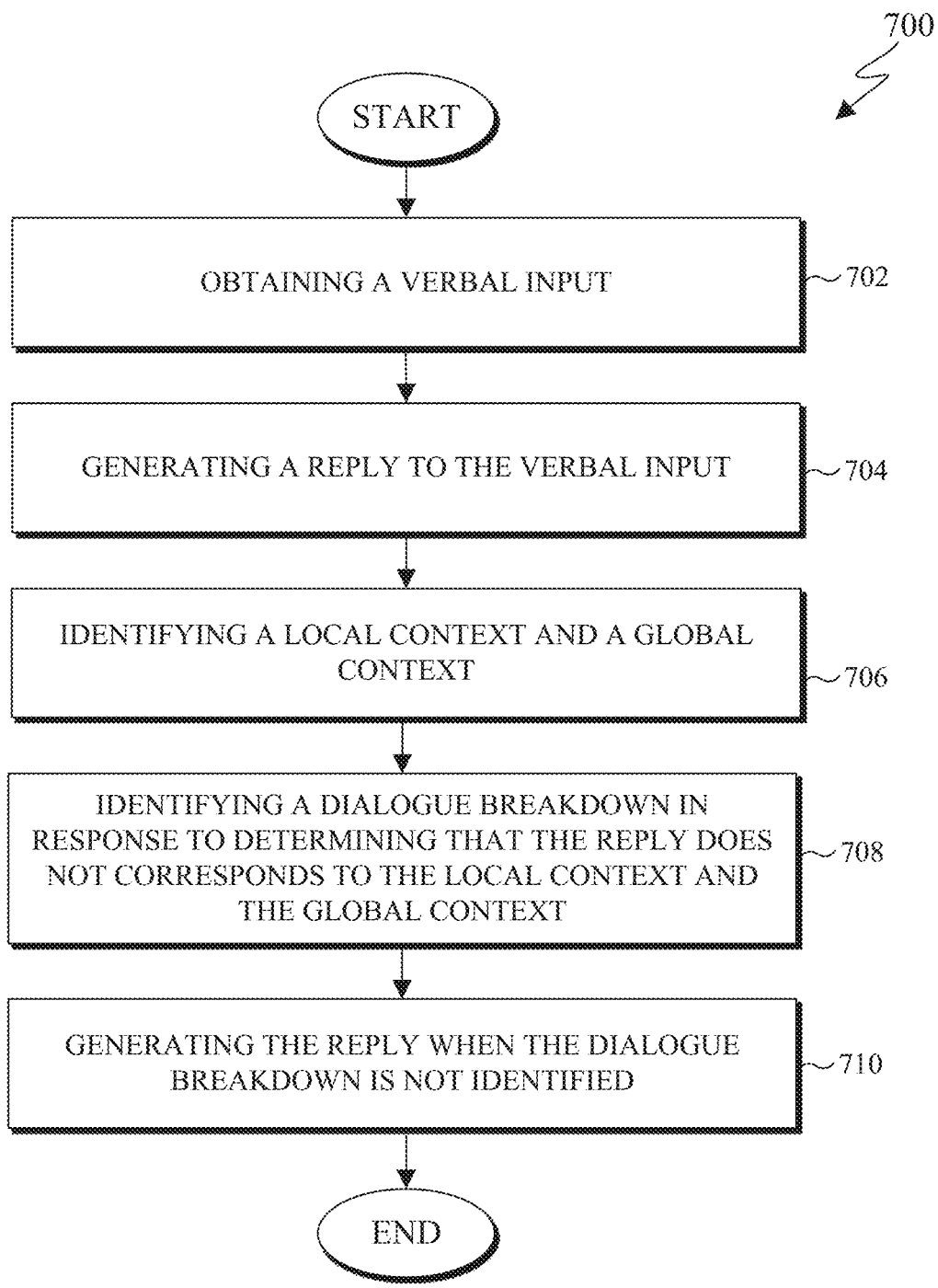
FIG. 7 illustrates an example method for dialogue breakdown detection in accordance with this disclosure.

FIG. 7 illustrates an example method 700 for dialogue breakdown detection in accordance with this disclosure. The method 700 may be performed by the server 104 or any of the client devices 106-114 of FIG. 1, the electronic device 201 or the server 206 of FIG. 2, or any other suitable device or system. For ease of explanation, the method 700 is described as being performed by the electronic device 201 that includes the natural language processing system 300 of FIG. 3 and the architecture 400a of FIG. 4. However, the method 700 can be used with any other suitable system.

In block 702, the electronic device 201 obtains an input. In certain embodiments, the input is a verbal input that is obtained via the audio sensor 295, for example the user utterance 402a and 402c of FIG. 4A. The input can be a text input such that the electronic device receives a typed utterance via a keyboard. The input can request that the electronic device 201 provide information or perform a particular task.

In block 704, the electronic device 201 generates a reply to the input. The reply responds to the input, for example the system utterance 402b and 402n of FIG. 4A. The reply can provide the requested information, confirm that the task is completed, or provide an incorrect response. An incorrect response corresponds to a dialogue breakdown.

In block 706, the electronic device 201 identifies local context and global context. The local context is based on the input, while the global context is based on the input, additional inputs that were previously received by the electronic device 201, and additional replies that were previously generated in response to the additional inputs. To identify the local and global context, the electronic device individually encodes the input and the reply using a LSTM neural network. In certain embodiments, the LSTM neural network is a BiLSTM neural network. The LSTM neural network generates a vector that represents the input.

The input and reply are individually encoded and processed with respect to a global LSTM network and a local LSTM network. The global LSTM network processes previous utterances (if available) and the input. The global LSTM network also processes previous utterances (if available) and the reply. The local LSTM network respectively processes the input and the reply with respect to a particular label. For example, if a label is assigned to the input or the reply, then a particular local LSTM network that is trained to identify keywords of an utterance (such as the input or the reply) based on the label assigned thereto. If no label is assigned to the input or the reply then all of the local LSTM networks that are trained with respect to the different labels process the utterance.

The electronic device 201 generates a weighted mixture of the global LSTM network and the local LSTM network. The weighted mixture of the global LSTM network and the local LSTM network is inputted into a global attention and a local attention. The electronic device 201 generates a weighted mixture of the global attention and the local attention.

When the label is assigned to the utterance, the weighted mixture of the global attention and the local attention is inputted into an overall attention. The overall attention combines one or more additional weighted mixtures that are associated with previous utterances to identify the local context and the global context. The local context is based on focused keywords within the verbal input and the global context is based on repeated keywords and mutual context information within the verbal input, the reply, the additional verbal inputs, and the previous replies. The local and global contexts are used to generate probabilities associated with labels of future utterances, such that a label can be selected and assigned to the future utterance. When no label is assigned to the utterance, the electronic device generates probabilities that are associated with possible labels. The probabilities are based on a memory score and an utterance score. The memory score is generated based on the context generated by the overall attention while the utterance score is generated based on the input and the reply.

Alternatively, in step 708, the electronic device 201 identifies a dialogue breakdown when the label assigned to the reply indicates that a breakdown occurred. In certain embodiments, when a breakdown occurs, the electronic device 201 generates a notification indicating that the dialogue breakdown occurred. The notification is a sound notification, a displayed notification, or both. In certain embodiments, when a breakdown occurs, the electronic device 201 recovering from the dialogue breakdown. In certain embodiments, the recovery can occur before the reply is provided to the user.

In block 710, the electronic device 201 generates a sound corresponding to the reply through a speaker when a dialogue breakdown is not identified. In response to determining that the reply corresponds to the local context and the global context, then a dialogue breakdown would not be identified. For example, the electronic device 201 replies to the user when the label assigned the system reply does not indicate there is a breakdown.

Although FIG. 7 illustrates one example of a method 700 for providing a request to an execution engine, various changes may be made to FIG. 7. For example, while shown as a series of steps, various steps in FIG. 7 could overlap, occur in parallel, or occur any number of times.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the applicants to refer to structures known to those skilled in the relevant art and is not intended to invoke 35 U.S.C. § 112(f).

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method comprising:
obtaining a verbal input from an audio sensor;
generating, by a processor, a reply to the verbal input;
identifying, by the processor, a local context and a global context, wherein the local context is based on the verbal input and identified using a first Long Short Term Memory (LSTM) Network, and wherein the global context is based on the verbal input, additional verbal inputs previously received by the audio sensor, and previous replies generated in response to the additional verbal inputs and identified using a second LSTM Network different than the first LSTM Network;
generating a weighted mixture of the local context and the global context;
identifying, by the processor, a dialogue breakdown in response to determining that the reply does not correspond to the local context and the global context based at least in part on the weighted mixture of the local context and the global context; and
generating sound corresponding to the reply through a speaker when the dialogue breakdown is not identified.

2. The method of claim 1, further comprising:
generating, by the processor, a notification that indicates that the dialogue breakdown occurred in response to identifying the dialogue breakdown,
wherein the notification includes at least one of a sound notification generated by the speaker and a visual notification output to a display.

3. The method of claim 1, further comprising:
recovering, by the processor, from the dialogue breakdown based on the local context and the global context in response to identification of the dialogue breakdown.

4. The method of claim 3, wherein recovering from the dialogue breakdown comprises:
identifying, by the processor, at least one of a first confidence score associated with automatic speech recognition, a second confidence score associated with natural language understanding, and a third confidence score associated with the verbal input;
identifying, by the processor, context associated with a state based on (i) verifying that the context associated with the state corresponds to the local context and the global context and (ii) at least one of the first confidence score, the second confidence score, and the third confidence score; and
generating, by the processor, a modified reply based on the context associated with the state,
wherein the state includes at least one of a slot, a keyword, a sentence, and the verbal input.

5. The method of claim 1, further comprising:
identifying temporal relationships between the verbal input, the previous replies, and the additional verbal inputs;
identifying the local context from focused keywords within the verbal input; and
identifying the global context from repeated keywords and mutual context information within the verbal input, the reply, the additional verbal inputs, and the previous replies.

6. The method of claim 5, wherein identifying the global context comprises identifying a quantity of the additional verbal inputs and the previous replies based on a window size.

7. The method of claim 1, wherein identifying the dialogue breakdown comprises:
generating a memory score that is associated with a first label, the memory score indicating a probability that the first label corresponds to the reply and the global context;
generating an utterance score that is associated with the first label, the utterance score indicating a probability that the reply corresponds to the verbal input;
assigning a first weight to the memory score and a second weight to the utterance score to generate a weighted memory score and a weighted utterance score, respectively;
generating a weighted score based on combining the weighted memory score and the weighted utterance score, the weighted score associated with the first label; and
comparing the weighted score to previous weighted scores that are associated with respective labels,
wherein the dialogue breakdown is identified when the first label is associated with the dialogue breakdown and the weighted score is larger than the previous weighted scores.

8. An electronic device comprising:
an audio sensor;
a speaker configured to generate sound;
a processor operably coupled to the audio sensor and the speaker; and
a memory operably coupled to the processor, the memory including instructions executable by the processor to:
obtain a verbal input from the audio sensor,
generate a reply to the verbal input,
identify a local context and a global context, wherein the local context is based on the verbal input and identified using a first Long Short Term Memory (LSTM) Network, and wherein the global context is based on the verbal input, additional verbal inputs previously received by the audio sensor, and previous replies generated in response to the additional verbal inputs and identified using a second LSTM Network different than the first LSTM Network,
generate a weighted mixture of the local context and the global context,
identify a dialogue breakdown in response to determining that the reply does not correspond to the local context and the global context based at least in part on the weighted mixture of the local context and the global context, and
generate the sound corresponding to the reply through the speaker when the dialogue breakdown is not identified.

9. The electronic device of claim 8, wherein:
the electronic device further comprises a display; and
the memory includes further instructions executable by the processor to generate a notification that indicates that the dialogue breakdown occurred in response to identifying the dialogue breakdown, wherein the notification includes at least one of a sound notification generated by the speaker and a visual notification output to the display.

10. The electronic device of claim 8, wherein the memory includes further instructions executable by the processor to recover from the dialogue breakdown based on the local context and the global context in response to identification of the dialogue breakdown.

11. The electronic device of claim 10, wherein, to recover from the dialogue breakdown, the memory includes instructions executable by the processor to:
identify at least one of a first confidence score associated with automatic speech recognition, a second confidence score associated with natural language understanding, and a third confidence score associated with the verbal input;
identify context associated with a state based on (i) verifying that the context associated with the state corresponds to the local context and the global context and (ii) at least one of the first confidence score, the second confidence score, and the third confidence score; and
generate a modified reply based on the context associated with the state,
wherein the state includes at least one of a slot, a keyword, a sentence, and the verbal input.

12. The electronic device of claim 8, wherein, to identify the local context and the global context, the memory includes instructions executable by the processor to:
identify temporal relationships between the verbal input, the previous replies, and the additional verbal inputs;
identify the local context from focused keywords within the verbal input; and
identify the global context from repeated keywords and mutual context information within the verbal input, the reply, the additional verbal inputs, and the previous replies.

13. The electronic device of claim 12, wherein to identify the global context, the memory includes instructions executable by the processor to identify a quantity of the additional verbal inputs and the previous replies based on a window size.

14. The electronic device of claim 8, wherein, to identify the dialogue breakdown, the memory includes instructions executable by the processor to:
generate a memory score that is associated with a first label, the memory score indicating a probability that the first label corresponds to the reply and the global context;
generate an utterance score that is associated with the first label, the utterance score indicating a probability that the reply corresponds to the verbal input;
assign a first weight to the memory score and a second weight to the utterance score to generate a weighted memory score and a weighted utterance score, respectively;
generate a weighted score based on combining the weighted memory score and the weighted utterance score, the weighted score associated with the first label; and
compare the weighted score to previous weighted scores that are associated with respective labels,
wherein the dialogue breakdown is identified when the first label is associated with the dialogue breakdown and the weighted score is larger than the previous weighted scores.

15. A non-transitory machine-readable medium containing instructions that when executed cause at least one processor of an electronic device to:
obtain a verbal input from an audio sensor;
generate a reply to the verbal input;
identify a local context and a global context, wherein the local context is based on the verbal input and identified using a first Long Short Term Memory (LSTM) Network, and wherein the global context is based on the verbal input, additional verbal inputs previously received by the audio sensor, and previous replies generated in response to the additional verbal inputs and identified using a second LSTM Network different than the first LSTM network;
generate a weighted mixture of the local context and the global context;
identify a dialogue breakdown in response to determining that the reply does not correspond to the local context and the global context based at least in part on the weighted mixture of the local context and the global context; and
generate sound corresponding to the reply through a speaker when the dialogue breakdown is not identified.

16. The non-transitory machine-readable medium of claim 15, further containing instructions that when executed cause the at least one processor to:
generate a notification that indicates that the dialogue breakdown occurred in response to identifying the dialogue breakdown,
wherein the notification includes at least one of a sound notification generated by the speaker and a visual notification output to a display.

17. The non-transitory machine-readable medium of claim 15, further containing instructions that when executed cause the at least one processor to:
recover from the dialogue breakdown based on the local context and the global context in response to identification of the dialogue breakdown.

18. The non-transitory machine-readable medium of claim 17, wherein the instructions that when executed cause the at least one processor to recover from the dialogue breakdown comprise instructions that when executed cause the at least one processor to:
identify at least one of a first confidence score associated with automatic speech recognition, a second confidence score associated with natural language understanding, and a third confidence score associated with the verbal input;
identify context associated with a state based on (i) verifying that the context associated with the state corresponds to the local context and the global context and (ii) at least one of the first confidence score, the second confidence score, and the third confidence score; and
generate a modified reply based on the context associated with the state,
wherein the state includes at least one of a slot, a keyword, a sentence, and the verbal input.

19. The non-transitory machine-readable medium of claim 15, further containing instructions that when executed cause the at least one processor to:
identify temporal relationships between the verbal input, the previous replies, and the additional verbal inputs;
identify the local context from focused keywords within the verbal input; and
identify the global context from repeated keywords and mutual context information within the verbal input, the reply, the additional verbal inputs, and the previous replies.

20. The non-transitory machine-readable medium of claim 15, further containing instructions that when executed cause the at least one processor to:

generate a memory score that is associated with a first label, the memory score indicating a probability that the first label corresponds to the reply and the global context;
generate an utterance score that is associated with the first label, the utterance score indicating a probability that the reply corresponds to the verbal input;
assign a first weight to the memory score and a second weight to the utterance score to generate a weighted memory score and a weighted utterance score, respectively;
generate a weighted score based on combining the weighted memory score and the weighted utterance score, the weighted score associated with the first label; and
compare the weighted score to previous weighted scores that are associated with respective labels,
wherein the dialogue breakdown is identified when the first label is associated with the dialogue breakdown and the weighted score is larger than the previous weighted scores.

\* \* \* \* \*